US012562866B2

(12) United States Patent
Yunusov et al.

(10) Patent No.: US 12,562,866 B2
(45) Date of Patent: Feb. 24, 2026

(54) PHASE TRACKING REFERENCE SIGNALING AND DATA MODULATION FOR MULTIPLE LAYERS

(71) Applicant: QUALCOMM Incorporated, San Diego, CA (US)

(72) Inventors: David Yunusov, Holon (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 694 days.

(21) Appl. No.: 17/929,264

(22) Filed: Sep. 1, 2022

(65) Prior Publication Data

US 2024/0080158 A1　　Mar. 7, 2024

(51) Int. Cl.
　　*H04L 5/00*　　　　(2006.01)
　　*H04L 1/00*　　　　(2006.01)

(52) U.S. Cl.
　　CPC .......... *H04L 5/0051* (2013.01); *H04L 1/0003* (2013.01); *H04L 1/0061* (2013.01)

(58) Field of Classification Search
　　CPC ... H04L 5/0051; H04L 1/0003; H04L 1/0061; H04L 2027/0067; H04L 5/0023; H04L 5/0044; H04L 5/0094; H04L 5/0048
　　See application file for complete search history.

(56) References Cited

U.S. PATENT DOCUMENTS

2008/0057963 A1 * 3/2008 Kayama ................ H04L 1/0007
　　　　　　　　　　　　　　　　　　　455/442
2018/0077603 A1 * 3/2018 John Wilson ......... H04W 72/20
(Continued)

FOREIGN PATENT DOCUMENTS

WO　　WO-2021090180 A1　　5/2021
WO　　WO-2022203558 A1　　9/2022

OTHER PUBLICATIONS

Ericsson: "Maintenance for Single-DCI Based Multi-TRP in Rel-16", 3GPP TSG-RAN WG1 Meeting #104bis, R1-2103552, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, 3 Pages, XP052178264, Sections 1-3.

(Continued)

*Primary Examiner* — Sun Jong Kim
(74) *Attorney, Agent, or Firm* — Holland & Hart LLP

(57)　　　　　　　ABSTRACT

Methods, systems, and devices for wireless communications are described. Generally, the described techniques provide for transmitting data signaling via a first set of subcarriers (e.g., data subcarriers) at a same transmit power as PTRS transmissions via a second set of subcarriers (e.g., PTRS subcarriers) via a first transmission layer. Additionally, the described techniques provide for transmitting data signaling via the first set of subcarriers and the second set of subcarriers via a second transmission layer. That is, a wireless device may transmit data signaling via the second transmission layer at subcarriers used for PTRS transmissions via the first transmission layer while maintaining an average energy across the first transmission layer and the second transmission layer. In some examples, a receiving device may estimate the phase noise error for each transmission layer using one or more PTRS transmissions or using signaling from each transmission layer.

30 Claims, 14 Drawing Sheets

(56)        References Cited

U.S. PATENT DOCUMENTS

| | | | |
|---|---|---|---|
| 2018/0254796 A1* | 9/2018 | Akkarakaran ....... | H04B 7/2656 |
| 2022/0201505 A1* | 6/2022 | Zhao ................... | H04B 7/06966 |
| 2022/0294590 A1* | 9/2022 | Gao ...................... | H04L 5/0053 |
| 2022/0385427 A1* | 12/2022 | Frenne ................. | H04L 5/0051 |
| 2023/0188190 A1* | 6/2023 | Zhu ....................... | H04L 1/0026 |
| | | | 370/329 |
| 2023/0198715 A1* | 6/2023 | Liu ....................... | H04L 5/0023 |
| | | | 370/329 |
| 2023/0283429 A1* | 9/2023 | Park ..................... | H04L 1/1854 |
| | | | 370/329 |
| 2023/0284230 A1* | 9/2023 | Cirik .................... | H04L 5/0048 |
| | | | 370/328 |

OTHER PUBLICATIONS

International Search Report and Written Opinion—PCT/US2023/ 029976—ISA/EPO—Nov. 9, 2023.

* cited by examiner

510

520

515

505

500

910

920

915

905

900

130

105

115

Network
Entity

Transceiver

1210

Antenna

1215

Communications
Manager

1220

Memory

Code

1230

1225

1240

Processor

1235

1205

1200

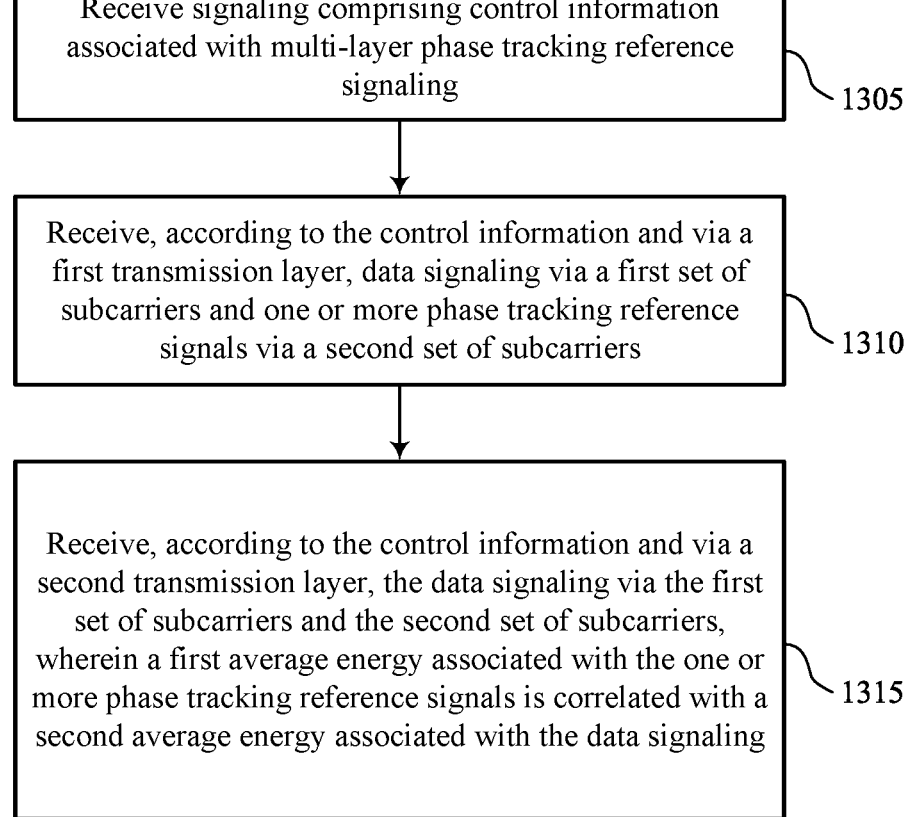

Receive signaling comprising control information associated with multi-layer phase tracking reference signaling

1305

Receive, according to the control information and via a first transmission layer, data signaling via a first set of subcarriers and one or more phase tracking reference signals via a second set of subcarriers

1310

Receive, according to the control information and via a second transmission layer, the data signaling via the first set of subcarriers and the second set of subcarriers, wherein a first average energy associated with the one or more phase tracking reference signals is correlated with a second average energy associated with the data signaling

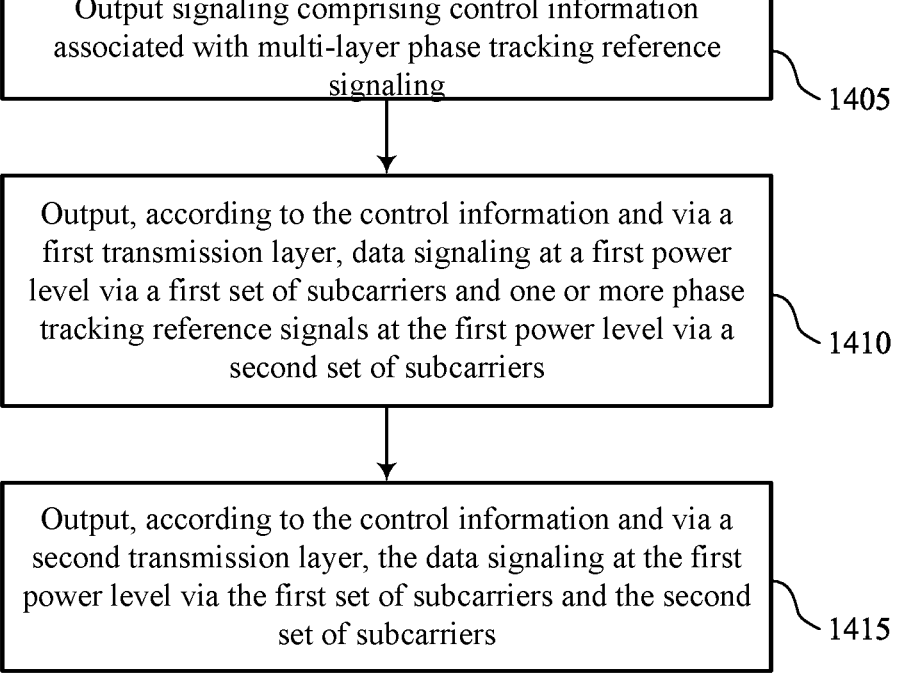

Output signaling comprising control information associated with multi-layer phase tracking reference signaling

1405

Output, according to the control information and via a first transmission layer, data signaling at a first power level via a first set of subcarriers and one or more phase tracking reference signals at the first power level via a second set of subcarriers

1410

Output, according to the control information and via a second transmission layer, the data signaling at the first power level via the first set of subcarriers and the second set of subcarriers

PHASE TRACKING REFERENCE SIGNALING AND DATA MODULATION FOR MULTIPLE LAYERS

FIELD OF TECHNOLOGY

The following relates to wireless communications, including phase tracking reference signaling and data modulation for multiple layers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support phase tracking reference signaling and data modulation for multiple layers. For example, the described techniques provide for transmitting data signaling via a first set of subcarriers (e.g., data subcarriers) at a same transmit power as phase tracking reference signal (PTRS) transmissions via a second set of subcarriers (e.g., PTRS subcarriers) via a first transmission layer. Additionally, the described techniques provide for transmitting data signaling via the first set of subcarriers and the second set of subcarriers via a second transmission layer. That is, a wireless device may transmit data signaling via the second transmission layer at subcarriers used for PTRS transmissions via the first transmission layer while maintaining an average energy across the first transmission layer and the second transmission layer. In some examples, such as when phase noise is common for the first transmission layer and the second transmission layer, a receiving device may use the PTRS transmissions (e.g., received via the first transmission layer) to estimate the phase noise error for both the first transmission layer and the second transmission layer. In some other examples, such as when the phase noise is different for the first transmission layer and the second transmission layer, the transmitting device may use a lower modulation and coding scheme (MCS) to transmit data signaling via the second transmission layer at subcarriers corresponding to subcarriers for PTRS transmissions via the first transmission layer. The receiving device may decode the data signaling with a lower MCS (e.g., received via subcarriers corresponding to subcarriers for PTRS transmissions via the first transmission layer) and reencode the data signaling to generate (e.g., regenerate) a PTRS pilot signal (e.g., may use re-generated PTRS pilots) for estimating phase noise error for the second transmission layer.

A method for wireless communications at a user equipment (UE) is described. The method may include receiving signaling including control information associated with multi-layer phase tracking reference signaling, receiving, according to the control information and via a first transmission layer, data signaling via a first set of subcarriers and one or more PTRSs via a second set of subcarriers, and receiving, according to the control information and via a second transmission layer, the data signaling via the first set of subcarriers and the second set of subcarriers, where a first average energy associated with the one or more phase tracking reference signals is correlated with a second average energy associated with the data signaling.

An apparatus for wireless communications at a UE is described. The apparatus may include a processor, memory coupled with the processor, and instructions stored in the memory. The instructions may be executable by the processor to cause the apparatus to receive signaling including control information associated with multi-layer phase tracking reference signaling, receive, according to the control information and via a first transmission layer, data signaling via a first set of subcarriers and one or more PTRSs via a second set of subcarriers, and receive, according to the control information and via a second transmission layer, the data signaling via the first set of subcarriers and the second set of subcarriers, where a first average energy associated with the one or more phase tracking reference signals is correlated with a second average energy associated with the data signaling.

Another apparatus for wireless communications at a UE is described. The apparatus may include means for receiving signaling including control information associated with multi-layer phase tracking reference signaling, means for receiving, according to the control information and via a first transmission layer, data signaling via a first set of subcarriers and one or more PTRSs via a second set of subcarriers, and means for receiving, according to the control information and via a second transmission layer, the data signaling via the first set of subcarriers and the second set of subcarriers, where a first average energy associated with the one or more phase tracking reference signals is correlated with a second average energy associated with the data signaling.

A non-transitory computer-readable medium storing code for wireless communications at a UE is described. The code may include instructions executable by a processor to receive signaling including control information associated with multi-layer phase tracking reference signaling, receive, according to the control information and via a first transmission layer, data signaling via a first set of subcarriers and one or more PTRSs via a second set of subcarriers, and receive, according to the control information and via a second transmission layer, the data signaling via the first set of subcarriers and the second set of subcarriers, where a first average energy associated with the one or more phase tracking reference signals is correlated with a second average energy associated with the data signaling.

In some examples of the method, apparatuses, and non-transitory computer-readable medium described herein, receiving the data signaling via the second transmission layer may include operations, features, means, or instructions for receiving first data signaling via a first transport block according to a first MCS and receiving second data signaling via a second transport block according to a second MCS, where the second MCS may have a lower value than the first MCS.

Some examples of the method, apparatuses, and non-transitory computer-readable medium described herein may further include operations, features, means, or instructions for receiving, in the second data signaling, a cyclic redundancy check corresponding to the second transport block and decoding the second transport block according to a convolution code, a polar code, or a low density polar code, where receiving the second data signaling may be based on the decoding.

Some examples of the method, apparatuses, and non-transitory computer-readable medium described herein may further include operations, features, means, or instructions for determining that the CRC does not pass for the second transport block, transmitting a feedback message using a feedback bit associated with the second transport block based on the determining, and monitoring for a retransmission or a repetition of the second transport block based on transmitting the feedback message, where receiving the second data signaling may be based on the monitoring.

Some examples of the method, apparatuses, and non-transitory computer-readable medium described herein may further include operations, features, means, or instructions for estimating a first phase noise error for the first transmission layer based on the one or more PTRSs, performing phase noise correcting for the first data signaling based on the first phase noise error, estimating a phase noise error for the second transmission layer based on the second data signaling, and performing phase noise correction for the second data signaling based on the second phase noise error.

In some examples of the method, apparatuses, and non-transitory computer-readable medium described herein, receiving the data signaling via the second transmission layer may include operations, features, means, or instructions for receiving the data signaling via the first set of subcarriers and the second set of subcarriers according to a first MCS, where a first phase noise error may be associated with both the first transmission layer and the second transmission layer.

Some examples of the method, apparatuses, and non-transitory computer-readable medium described herein may further include operations, features, means, or instructions for estimating a first phase noise error for the first transmission layer based on the one or more PTRSs, performing phase noise correcting for the first data signaling based on the first phase noise error, and performing phase noise correction for the second data signaling based on the first phase noise error.

Some examples of the method, apparatuses, and non-transitory computer-readable medium described herein may further include operations, features, means, or instructions for transmitting, responsive to receiving the data signaling via the first transmission layer and the second transmission layer, a phase noise error estimation report.

In some examples of the method, apparatuses, and non-transitory computer-readable medium described herein, receiving the control signaling may include operations, features, means, or instructions for receiving a control message including an indication of the multi-layer phase tracking reference signaling, a first MCS associated with the first transmission layer and a second MCS associated with the second transmission layer.

Some examples of the method, apparatuses, and non-transitory computer-readable medium described herein may further include operations, features, means, or instructions for transmitting an indication of a signal to noise ratio (SNR) supported by the UE, where receiving the control message may be based on the SNR satisfying a threshold.

Some examples of the method, apparatuses, and non-transitory computer-readable medium described herein may further include operations, features, means, or instructions for transmitting an indication of a phase noise mask, a phase noise estimate, or both, where receiving the control message may be based on the phase noise mask, the phase noise estimate, or both.

Some examples of the method, apparatuses, and non-transitory computer-readable medium described herein may further include operations, features, means, or instructions for transmitting a request for a transmission rank associated with the first transmission layer and the second transmission layer, a threshold difference between the first MCS and the second MCS, or both, where receiving the control message may be based on the transmission rank, the threshold difference, or both.

In some examples of the method, apparatuses, and non-transitory computer-readable medium described herein, the control message includes a radio resource control message including one or more parameters associated with the multi-layer phase tracking reference signaling configuration.

In some examples of the method, apparatuses, and non-transitory computer-readable medium described herein, the control message includes a downlink control information message activating the multi-layer phase tracking reference signaling configuration.

A method for wireless communications at a network entity is described. The method may include outputting signaling including control information associated with multi-layer phase tracking reference signaling, outputting, according to the control information and via a first transmission layer, data signaling at a first power level via a first set of subcarriers and one or more PTRSs at the first power level via a second set of subcarriers, and outputting, according to the control information and via a second transmission layer, the data signaling at the first power level via the first set of subcarriers and the second set of subcarriers.

An apparatus for wireless communications at a network entity is described. The apparatus may include a processor, memory coupled with the processor, and instructions stored in the memory. The instructions may be executable by the processor to cause the apparatus to output signaling including control information associated with multi-layer phase tracking reference signaling, output, according to the control information and via a first transmission layer, data signaling at a first power level via a first set of subcarriers and one or more PTRSs at the first power level via a second set of subcarriers, and output, according to the control information and via a second transmission layer, the data signaling at the first power level via the first set of subcarriers and the second set of subcarriers.

Another apparatus for wireless communications at a network entity is described. The apparatus may include means for outputting signaling including control information associated with multi-layer phase tracking reference signaling, means for outputting, according to the control information and via a first transmission layer, data signaling at a first power level via a first set of subcarriers and one or more PTRSs at the first power level via a second set of subcarriers, and means for outputting, according to the control information and via a second transmission layer, the data signaling at the first power level via the first set of subcarriers and the second set of subcarriers.

A non-transitory computer-readable medium storing code for wireless communications at a network entity is described. The code may include instructions executable by a processor to output signaling including control information associated with multi-layer phase tracking reference signaling, output, according to the control information and via a first transmission layer, data signaling at a first power level via a first set of subcarriers and one or more PTRSs at the first power level via a second set of subcarriers, and output, according to the control information and via a second transmission layer, the data signaling at the first power level via the first set of subcarriers and the second set of subcarriers.

In some examples of the method, apparatuses, and non-transitory computer-readable medium described herein, outputting the data signaling via the second transmission layer may include operations, features, means, or instructions for outputting first data signaling via a first transport block according to a first MCS and outputting second data signaling via a second transport block according to a second MCS, where the second MCS may have a lower value than the first MCS.

Some examples of the method, apparatuses, and non-transitory computer-readable medium described herein may further include operations, features, means, or instructions for including, in the second data signaling, a CRC corresponding to the second transport block and encoding the second transport block according to a convolution code, a polar code, or a low density polar code, where outputting the second data signaling may be based on the encoding.

In some examples of the method, apparatuses, and non-transitory computer-readable medium described herein, outputting the data signaling via the first set of subcarriers and the second set of subcarriers may include operations, features, means, or instructions for outputting the data signaling via the first set of subcarriers and the second set of subcarriers according to a first MCS, where a first phase noise error may be associated with both the first transmission layer and the second transmission layer.

Some examples of the method, apparatuses, and non-transitory computer-readable medium described herein may further include operations, features, means, or instructions for obtaining, from at least one user equipment responsive to outputting the data signaling via the first transmission layer and the second transmission layer, a phase noise error estimation report.

In some examples of the method, apparatuses, and non-transitory computer-readable medium described herein, outputting the control signaling may include operations, features, means, or instructions for outputting a control message including an indication of the multi-layer phase tracking reference signaling, a first MCS associated with the first transmission layer, and a second MCS associated with the second transmission layer.

Some examples of the method, apparatuses, and non-transitory computer-readable medium described herein may further include operations, features, means, or instructions for obtaining, from a UE, an indication of a SNR supported by the UE, where outputting the control message may be based on the SNR satisfying a threshold.

Some examples of the method, apparatuses, and non-transitory computer-readable medium described herein may further include operations, features, means, or instructions for obtaining, from a UE, an indication of a phase noise mask, a phase noise estimate, or both, where outputting the control message may be based on the phase noise mask, the phase noise estimate, or both.

Some examples of the method, apparatuses, and non-transitory computer-readable medium described herein may further include operations, features, means, or instructions for obtaining, from a UE, a request for a transmission rank associated with the first transmission layer and the second transmission layer, a threshold difference between the first MCS and the second MCS, or both, where outputting the control message may be based on the transmission rank, the threshold difference, or both.

In some examples of the method, apparatuses, and non-transitory computer-readable medium described herein, the control message includes a radio resource control message including one or more parameters associated with the multi-layer phase tracking reference signaling. In some examples of the method, apparatuses, and non-transitory computer-readable medium described herein, the control message includes a downlink control information message activating the multi-layer phase tracking reference signaling.

In some examples of the method, apparatuses, and non-transitory computer-readable medium described herein, the first average energy is correlated with the second average energy such that a difference between the first average energy and the second average energy satisfies an average energy threshold.

BRIEF DESCRIPTION OF THE DRAWINGS

FIGS. 13 and 14 show flowcharts illustrating methods that support phase tracking reference signaling and data modulation for multiple layers in accordance with one or more aspects of the present disclosure.

DETAILED DESCRIPTION

Figure 1:
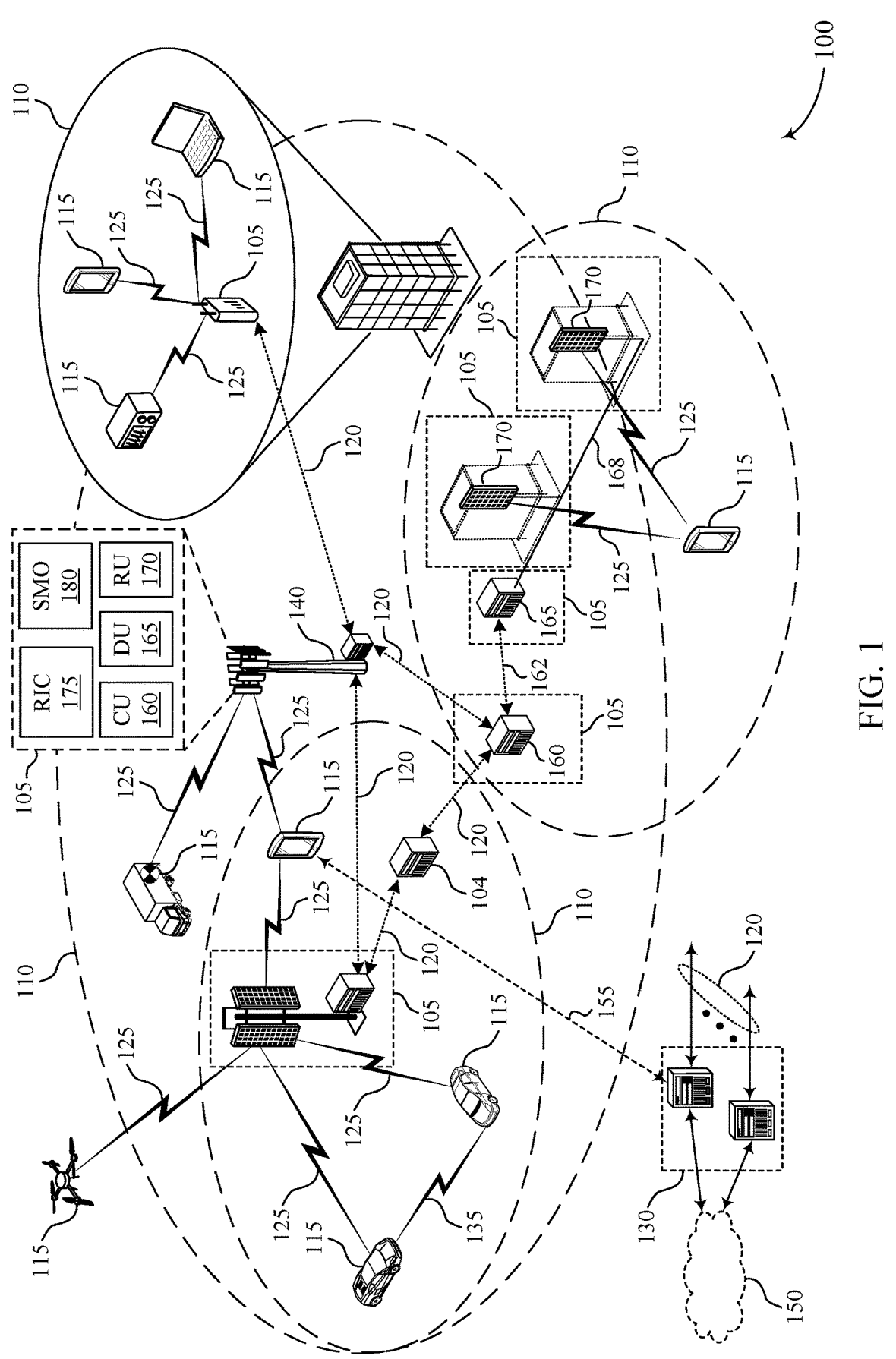
FIG. 1 illustrates an example of a wireless communications system that supports phase tracking reference signaling and data modulation for multiple layers in accordance with one or more aspects of the present disclosure.

Wireless communications systems may support communications between a user equipment (UE) and a network entity via an uplink communications link (e.g., for transmissions from the UE) and a downlink communications link (e.g., for transmissions from the network entity). In some cases, the network entity may transmit downlink communications to the UE via one or more transmission layers, and may generate phase noise associated with the downlink communications. The network entity may transmit one or more phase tracking reference signals (PTRSs) to support mitigating or reducing phase noise errors at the UE. For example, to address fluctuations in a phase of one or more waveforms transmitted to the UE (i.e., phase noise error), the network entity may transmit data via a first set of subcarriers, and may transmit one or more PTRSs via a second set of subcarriers. Further, the network entity may perform communications via multiple transmission layers, such as when the network entity operates according to a multi-in multi-out (MIMO) framework.

In some cases, the network entity may perform data signaling via the first set of subcarriers corresponding to a first transmission layer and a second transmission layer, and may transmit PTRSs via the second set of subcarriers on the first transmission layer. That is, the network entity may concurrently transmit data via subcarriers having a same set of subcarrier indices (e.g., corresponding to the first set of subcarriers) via both the first transmission layer and the second transmission layer. The network entity may increase (e.g., boost) the transmit power at the subcarriers corresponding to PTRS transmissions via the first transmission layer, and may refrain from transmitting signaling via the second transmission layer at the subcarriers corresponding to the PTRS transmissions in order to maintain a similar average transmit power across the first transmission layer and the second transmission layer. For example, the network entity may boost a transmit power (e.g., double the transmit power) for a PTRS transmission corresponding to a first subcarrier via the first transmission layer, and the network entity may reduce a transmit power (e.g., reduce to zero, refrain from transmitting) for the first subcarrier via the second transmission layer, which may support a same average transmission energy across the first transmission later and the second transmission layer.

In some examples, however, boosting the transmit power of a PTRS may result in adverse effects, such as increasing a peak-to-average-power ratio (PAPR) of signaling via a communications link (e.g., the downlink communications link). Accordingly, communicating devices may experience an increased PAPR at the first transmission layer, as well as inefficient resource utilization at the second transmission layer (e.g., due to boosting the transmit power of one or more subcarriers at the first transmission layer and refraining from transmitting via the one or more subcarriers at the second transmission layer). Such inefficient use of available resources and increased PAPR may result in increased system latency, decreased reliability of wireless signaling, and reduced user experience.

Techniques described herein may support efficient resource utilization and improved PAPR across multiple transmission layers. The network entity may transmit data signaling via a first set of subcarriers (e.g., data subcarriers) at a same transmit power as PTRS transmissions via a second set of subcarriers (e.g., PTRS subcarriers) via the first transmission layer at a single transmit power (e.g., without boosting PTRS transmit power). Additionally, the network entity may transmit data signaling via the first set of subcarriers and the second set of subcarriers via the second transmission layer (e.g., at the same transmit power). That is, the network entity may transmit data signaling via the second transmission layer at subcarriers used for PTRS transmissions via the first transmission layer while maintaining an average energy across the first transmission layer and the second transmission layer.

In some examples, such as when phase noise is common for the first transmission layer and the second transmission layer, a UE receiving the PTRS transmissions (e.g., received via the first transmission layer) may use the PTRSs to estimate the phase noise error for both the first transmission layer and the second transmission layer. In such examples, the data transmissions via the PTRS subcarriers of the second transmission layer may be transmitted and received according to a single modulation and coding scheme (MCS) (e.g., a high MCS) In some other examples, such as when the phase noise is different for the first transmission layer and the second transmission layer, the network entity may use a lower MCS to transmit data signaling via the PTRS subcarriers of the second transmission layer, which the receiving UE may use to generate a PTRS pilot signal for estimating phase noise error for the second transmission layer. For example, the UE may decode the data signaling (e.g., with a lower MCS), reencode the data, and use the data signaling as the PTRS pilot signal. In some examples, the network entity may configure the multi-layer signaling in response to a capability report from the UE, and may indicate the configuration to the UE (e.g., via radio resource control (RRC) signaling or via downlink control information (DCI) signaling).

Aspects of the disclosure are initially described in the context of wireless communications systems. Aspects of the disclosure are illustrated by and further described with reference to transmission configurations and process flows. Aspects of the disclosure are further illustrated by and described with reference to apparatus diagrams, system diagrams, and flowcharts that relate to phase tracking reference signaling and data modulation for multiple layers.

FIG. 1 illustrates an example of a wireless communications system 100 that supports phase tracking reference signaling and data modulation for multiple layers in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support phase tracking reference signaling and data modulation for multiple layers as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, the wireless communications system 100 may support efficient resource utilization and PAPR mitigation for a first transmission layer and a second transmission layer. A network entity 105 may transmit data signaling via a first set of subcarriers (e.g., data subcarriers) at a same transmit power as PTRS transmissions via a second set of subcarriers (e.g., PTRS subcarriers) for the first transmission layer at a single transmit power (e.g., without boosting PTRS transmit power). Additionally, the network entity 105 may transmit data signaling via the first set of subcarriers and the second set of subcarriers via the second transmission layer (e.g., at the same transmit power). That is, the network entity 105 may transmit data signaling via the second transmission layer at subcarriers used for PTRS transmissions via the first transmission layer while maintaining an average energy across the first transmission layer and the second transmission layer.

In some examples, such as when phase noise is common for the first transmission layer and the second transmission layer, a UE 115 receiving the PTRS transmissions (e.g., via the first transmission layer) may use the PTRSs to estimate the phase noise error for both the first transmission layer and the second transmission layer. In such examples, the data transmissions via the PTRS subcarriers of the second transmission layer may be transmitted and received according to a single modulation and coding scheme (MCS) (e.g., a high MCS). In some other examples, such as when the phase noise is different for the first transmission layer and the second transmission layer, the network entity 105 may use a lower MCS to transmit data signaling via PTRS subcarriers on the second transmission layer, which the receiving UE 115 may use to generate a PTRS pilot signal for estimating phase noise error for the second transmission layer. For example, the UE 115 may decode the data signaling (e.g., with a lower MCS), reencode the data, and use the data signaling as the PTRS pilot signal for the second transmission layer.

Figure 2:
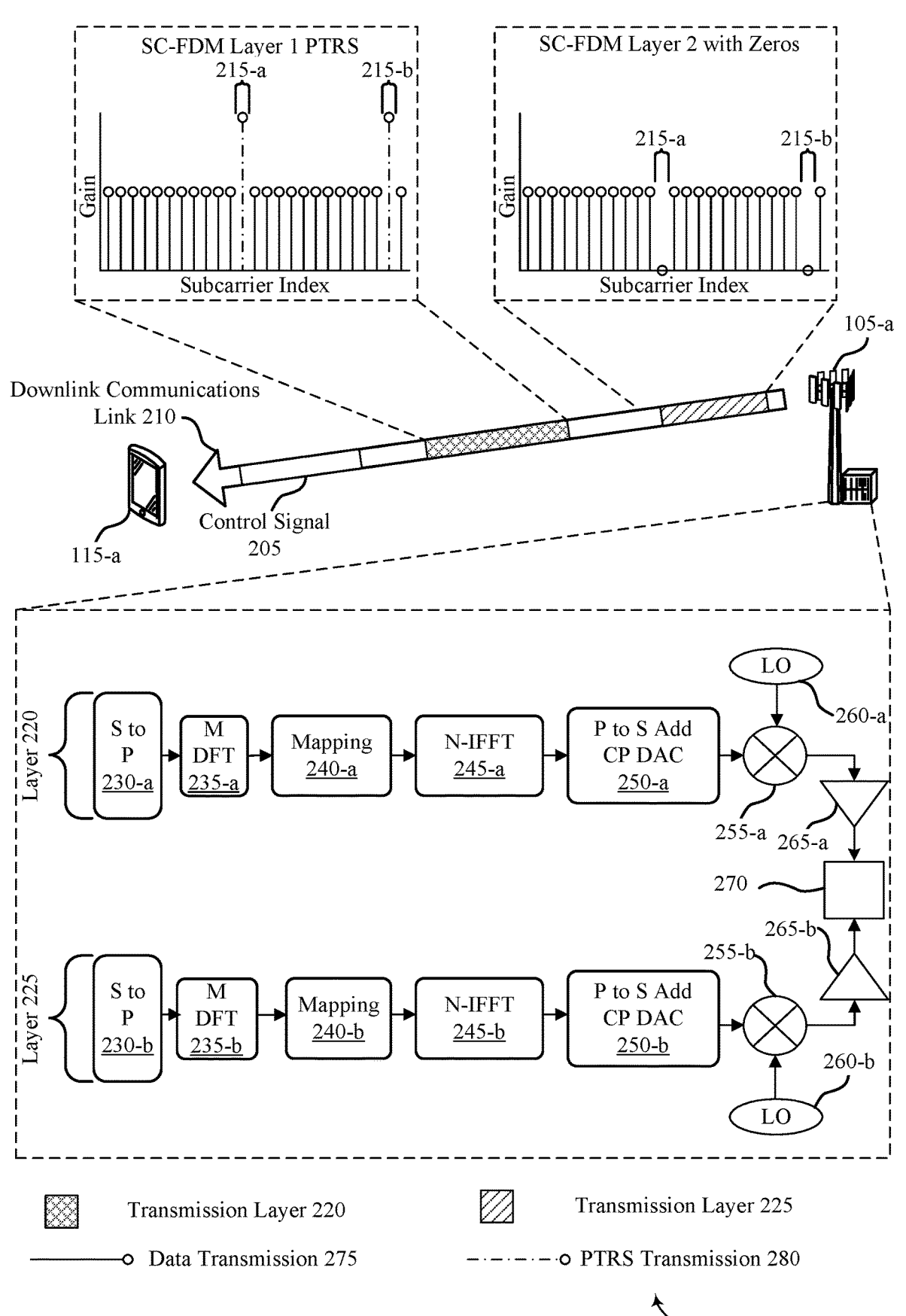
FIG. 2 illustrates an example of a wireless communications system that supports phase tracking reference signaling and data modulation for multiple layers in accordance with one or more aspects of the present disclosure.

FIG. 2 illustrates an example of a wireless communications system 200 that supports phase tracking reference signaling and data modulation for multiple layers in accordance with one or more aspects of the present disclosure. In some cases, the wireless communications system 200 may implement aspects of the wireless communications system 100. For example, the wireless communications system 200 may include a network entity 105-a and a UE 115-a, which may be examples of a network entity 105 and a UE 115, respectively, as described with reference to FIG. 1. In some examples, the network entity 105-a may transmit (e.g., via a downlink communications link 210) a control signal 205 to the UE 115-a, and may perform one or more subsequent transmissions via multiple transmission layers. That is, the network entity 105-*a* may transmit a transmission layer 220 (e.g., a first transmission layer) and may transmit a transmission layer 225 (e.g., a second transmission layer). Additionally, or alternatively, the network entity 105-*a* may perform transmissions via the layer 220 and the layer 225 using respective transmission chains, as illustrated by FIG. 2.

In some cases, a wireless device (e.g., the network entity 105-*a*, the UE 115-*a*) may perform transmissions using a type of waveform which supports relatively high channel robustness and data throughput, such as an orthogonal frequency division multiplexing (OFDM) waveform. For example, the likelihood of channel conditions (e.g., channel fading) interfering with transmissions from the wireless device may be mitigated by using an OFDM waveform. Further, using an OFDM waveform may enable the wireless device to perform transmissions according to a MIMO framework. However, OFDM waveforms may be associated with a relatively higher power consumption at the wireless device, and other waveforms may support relatively lower power consumption. For example, a time domain waveform may support relatively low power consumption and low complexity phase noise mitigation, based on the use of time domain PTRS signaling (e.g. integrated phase noise (IPN) may increase dramatically in some bands, such as Sub THz bands). IN some examples, the UE 115-*a* may support a discrete Fourier transform-spread-OFDM (DFT-s-OFDM) waveform to support both channel robustness and reduced power consumption.

In some cases, using a DFT-s-OFDM waveform may support interference mitigation (e.g., inter-symbol interference (ISI) frequency equalization, inter-channel interference (ICI) time domain phase noise estimation)) at the wireless device, and may support reduced power consumption in power intensive systems (e.g., high frequency bands, high data rates, or both). For example, using a DFT-s-OFDM waveform may enable the network entity 105-*a* to transmit a phase tracking reference signal (PTRS) as part of integrated phase noise (IPN) mitigation, which may increase the reliability of relatively low-frequency communications (e.g., sub-THz frequency bands). DFT-s-OFDM waveforms may support one or more transmission layers, and as described herein, may also support uplink or downlink signaling via multiple transmission layers.

The network entity 105-*a* may be configured to use multiple transmission chains to perform communications according to a MIMO framework. For example, the network entity 105-*a* may use a first transmission chain to communicate DFT-s-OFDM waveforms via a first transmission layer (e.g., the transmission layer 220) and may use a second transmission chain to communicate DFT-s-OFDM waveforms via a second transmission layer (e.g., the transmission layer 225). In some examples, a transmission chain (e.g., the first transmission chain and the second transmission chain) may include one or more components which support transmitting DFT-s-OFDM waveforms. For example, to generate a DFT-s-OFDM waveform for the first transmission layer, the network entity 105-*a* may provide an input stream (e.g., data symbols, PTRS symbols, or both) to a serial-to-parallel component 230-*a*, which may parallelize the input stream (e.g., having a higher data rate) into multiple data streams (e.g., having a lower data rate). The network entity 105-*a* may then perform a discrete Fourier transform (DFT) on the multiple data streams using an M-DFT component 235-*a*, and may map the data streams in the frequency domain with a mapping component 240-*a*. Further, the network entity 105-*a* may re-obtain a time-domain waveform using an N-inverse fast Fourier transform (N-IFFT) component 245-*a*, and may serialize the waveform using a parallel-to-serial add cyclic prefix (CP) digital-to-analog converter (DAC) component 250-*a*. The network entity 105-*a* may multiplex this waveform with a signal from a local oscillator 260-*a* via a mixer 255-*a*, may boost the signal via a power amplifier 265-*a*, and may transmit the waveform via an antenna 270. Additionally, or alternatively, the network entity 105-*a* may perform a similar process to generate a DFT-s-OFDM waveform using the second transmission chain (e.g., associated with the transmission layer 225), which may include components corresponding to the first transmission chain (e.g., a serial-to-parallel component 230-*b*, an M-DFT component 235-*b*, a mapping component 240-*b*, an N-IFFT component 245-*b*, a parallel-to-serial add CP DAC component 250-*b*, a mixer 255-*b*, a local oscillator 260-*b*, and a power amplifier 265-*b*)

In some examples, the network entity 105-*a* may transmit DFT-s-OFDM waveforms via a set of sub-carriers for each transmission layer. That is, the network entity 105-*a*, after parallelizing the input data stream at each layer, may use a set of subcarriers for transmission of DFT-s-OFDM waveforms via the transmission layer 220 and may use the same set of subcarriers for transmission DFT-s-OFDM waveforms via the transmission layer 225. Within a set of subcarriers, the network entity 105-*a* may utilize a first subset of subcarriers via which to transmit data signaling, and may utilize a second subset of subcarriers via which to transmit PTRSs (e.g., to support phase noise estimation and correction). For example, the network entity 105-*a* may partition the set of subcarriers corresponding to a DFT-s-OFDM waveform at the transmission layer 220 such that PTRS transmissions 280 occur at a subcarrier 215-*a* and a subcarrier 215-*b* (e.g., the second subset of subcarriers) and data signaling 275 occurs at the remaining subcarriers of the set of subcarriers (e.g., the first subset of subcarriers).

In some communications systems, the network entity 105-*a* may increase the transmit power (e.g., may boost the transmit power) of the subcarriers 215 corresponding to PTRS transmissions 280 via the transmission layer 220 (e.g., to increase the likelihood of a receiving device such as the UE 115-*a* successfully receiving the PTRS transmissions to estimate phase noise for downlink communications. However, increasing the transmission power of the PTRS transmissions may result in an increase to a PAPR of the downlink communications, which may be associated with a higher sensitivity to a non-linearity of the power amplifier 265-*a*. Additionally, the network entity 105-*a* may refrain from transmitting data signaling 275 via the subcarriers 215 (e.g., corresponding to PTRS transmissions via the transmission layer 220) via the transmission layer 225 to maintain a same average energy between the transmission layer 220 and the transmission layer 225, which may result in inefficient usage of resources (e.g., reduced throughput) at the transmission layer 225. In some cases, boosting the transmit power of a subcarrier 215 at the layer 220 and refraining from transmitting via the same subcarrier 215 at the layer 225 may result in each transmission layer operating the respective power amplifier 265 with different back off values, resulting in an energy imbalance between the transmission layer 220 and the transmission layer 225.

Techniques described herein may support modulation of time domain PTRS and data layer mapping for MIMO DFT-s-OFDM, which may improve overall throughput and reduce PTRS overhead. Time domain PTRS mapping as described herein (e.g., with reference to FIGS. 3-4) may occur via a single transmission layer, but without transmit power boosting, and data transmissions may be combined on a same resource element over different layers. Time domain PTRS and data layer mapping for DFT-s-OFDM MIMO use cases may improve throughput. Added data symbols (e.g., on the PTRS subcarriers but on the second transmission layer) may be transmitted using a same MCS as other subcarriers on the second transmission layer, or with a lower MCS, in which case the added data signaling may be used as a PTRS pilot signal after decoding of the data (e.g., the UE 115-a may re-encode the decoded data and use the reencoded data as a PTRS pilot signal). Techniques described herein may improve power conservation (e.g., because boosting time domain DFT-s-OFDM PTRSs may not improve phase noise estimation, as it creates power fluctuation over time). PTRSs may be transmitted without transmission power boosting compared to data symbols, resulting in identical (e.g., or similar within a threshold error) non-linearity impacts as DMRS symbols. Such techniques may improve phase noise estimation accuracy, and may increase throughput by transmitting data on PTRS REs on other transmission layers. Although techniques described herein refer to two transmission layers (e.g., the transmission layer 220 and the transmission layer 225), techniques described herein may also be performed across any number of transmission layers (e.g., a first transmission layer including PTRS transmissions 280 and multiple second transmission layers including data transmissions during subcarriers 215).

Figure 3:
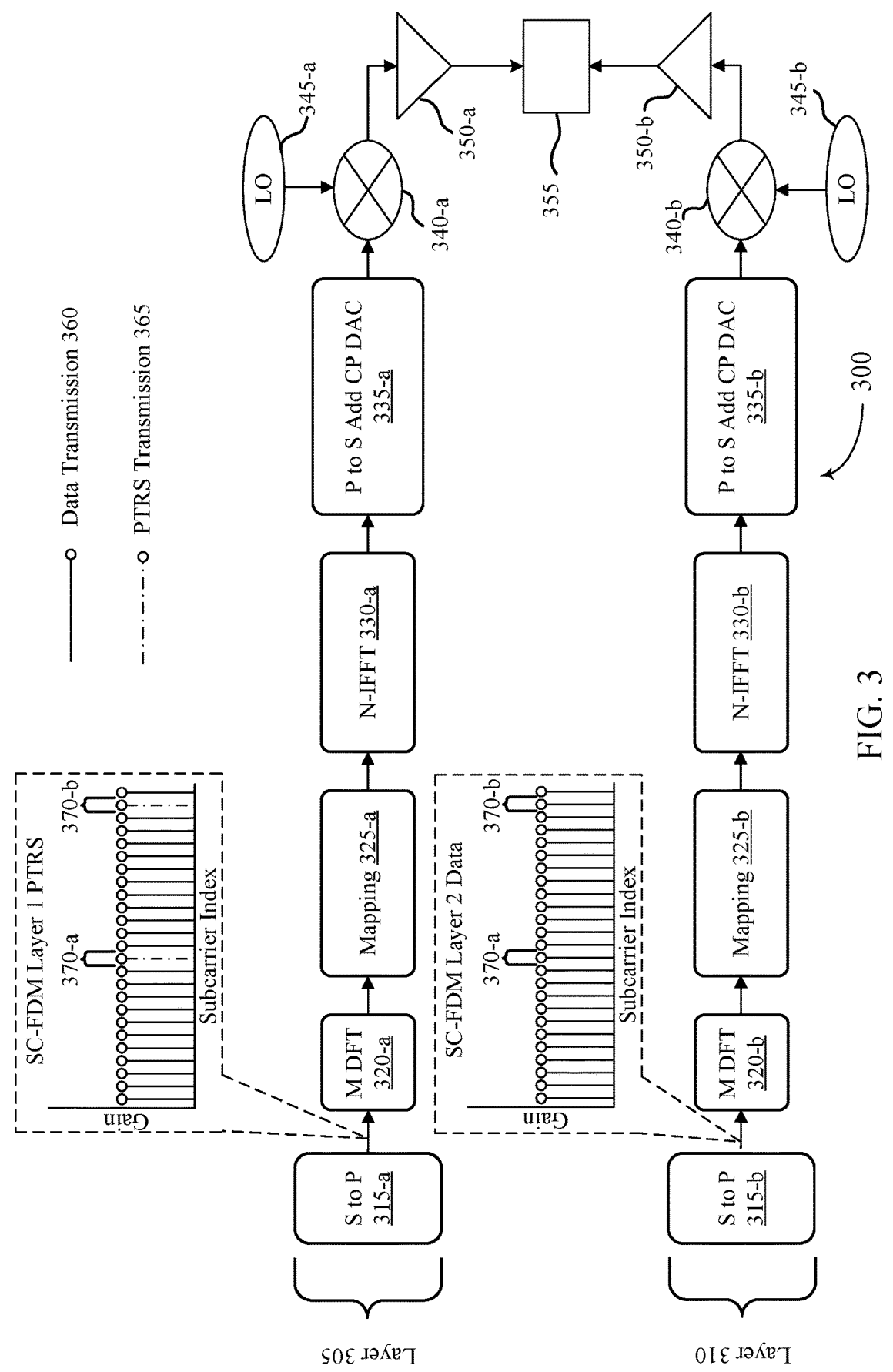
FIG. 3 illustrates an example of a transmission configuration that supports phase tracking reference signaling and data modulation for multiple layers in accordance with one or more aspects of the present disclosure.

FIG. 3 illustrates an example of a transmission configuration 300 that supports phase tracking reference signaling and data modulation for multiple layers in accordance with one or more aspects of the present disclosure. In some cases, the transmission configuration 300 may be implemented by aspects of the wireless communications systems 100 and 200, as described with reference to FIGS. 1 and 2, respectively. For example, the transmission configuration may be implemented by the network entity 105-a, which may transmit a DFT-s-OFDM waveform via a first transmission layer 305 (e.g., corresponding to the transmission layer 220) and a second transmission layer 310 (e.g., corresponding to the transmission layer 225) according to a MIMO framework, as described further with reference to FIG. 2. The transmission configuration 300 may include a subcarrier set, which may include data signaling 360 (e.g., via a first subset of the set of subcarriers) and one or more PTRS transmissions 365 (e.g., via a second subset of the set of subcarriers).

In some examples, a network entity 105 may use multiple transmission chains to generate a respective DFT-s-OFDM waveform. That is, the network entity 105 may use components of each transmission chain (e.g., a serial-to-parallel component 315-a and a serial-to-parallel component 315-b, an M-DFT component 320-a and an M-DFT component 320-b, a mapping component 325-a and a mapping component 325-b, an N-IFFT component 330-a and an N-IFFT component 330-b, a parallel-to-serial add CP DAC component 335-a and a parallel-to-serial add CP DAC component 335-b, a mixer 340-a and a mixer 340-b, a local oscillator 345-a and a local oscillator 345-b, a power amplifier 350-a and a power amplifier 350-b, an antenna 355, or any combination thereof) to generate respective DFT-s-OFDM waveforms using techniques described further with reference to FIG. 2.

To support improving a PAPR of a DFT-s-OFDM waveform while transmitting one or more PTRS transmissions 365, the network entity 105 may transmit data signaling 360 and PTRS transmissions 365 at a same power level across a set of subcarriers. For example, for performing transmissions via the transmission layer 305, the network entity 105 may transmit PTRS transmissions 365 via a subcarrier 370-a and a subcarrier 370-b (e.g., a second set of subcarriers), and may transmit data signaling 360 via the remaining subcarriers of the set of subcarriers (e.g., a first set of subcarriers) at a same power level at the subcarriers 370. Additionally, or alternatively, for performing transmission via the transmission layer 310, the network entity 105 may transmit data signaling 360 via each subcarrier of the set of subcarriers at a same power level (e.g. including subcarriers 370-a and 370-b corresponding to PTRS transmissions 365 at the transmission layer 305). By maintaining a same power level within the set of subcarriers, as well as across the transmission layer 305 and the transmission layer 310, the network entity 105 may increase data throughput (e.g., due to utilizing each subcarrier in the set of subcarriers for data signaling 360 via the transmission layer 310) and may reduce or mitigate the PAPR of the DFT-s-OFDM waveform (e.g., due to performing the PTRS transmissions 365 at a same power level as the data signaling 360). Such techniques may further support non-linearity correction at the network entity 105 while maintaining the phase noise estimation provided by the PTRS transmissions 365.

In some examples, a receiving device, such as a UE 115 (e.g., the UE 115-a as described with reference to FIG. 2), may receive one or more transmissions from the network entity 105 via the transmission layer 305, the transmission layer 310, or both. For example, the UE 115 may receive data signaling 360 and PTRS transmissions 365 via the transmission layer 305, and may receive data signaling 360 via the transmission layer 310. The UE 115 may then use the one or more transmissions from the network entity 105 to determine a phase noise error for the transmission layer 305 and the transmission layer 310. For example, the UE 115 may use the PTRS transmissions 365 to estimate the phase noise error for the transmission layer 305, and may perform phase noise correcting based on the estimated phase noise. In some examples, the UE 115 may determine whether the phase noise is common between the transmission layer 305 and the transmission layer 310. That is, the UE 115 may apply the phase noise correction (e.g., corresponding to the transmission layer 305) to the transmission layer 310 (e.g., if the phase noise is common between the transmission layer 305 and the transmission layer 310, then the phase noise correction for the transmission layer 305 may successfully compensates for phase noise error for the transmission layer 310). In some examples, such as when the phase noise error is common between the transmission layer 305 and the transmission layer 310, the UE 115 may perform phase noise correction for each transmission layer in accordance with an estimated phase noise error corresponding to the PTRS transmissions 365 via the transmission layer 305.

In some other examples, such as when the phase noise error is uncommon between the transmission layer 305 and the transmission layer 310, the UE 115 may perform phase noise correction for the transmission layer 305 using the estimated phase noise error from the PTRS transmissions 365 received via the transmission layer 305, and may perform phase noise correction for the transmission layer 310 using one or more portions of the data signaling 360 received via the transmission layer 310. In some such examples, the network entity 105 may transmit one or more data signals 360 via the subcarriers 370 (e.g., corresponding to PTRS subcarriers for the transmission layer 305) of the set of subcarriers (e.g., corresponding to the transmission layer 310) according to a lower MCS (e.g., with respect to other data signals 360 transmitted via the second transmission layer 310). The UE 115 may decode the data signaling 360 (e.g., each subcarrier of the set of subcarriers corresponding to the transmission layer 310), may identify the one or more data signals 360 using a lower MCS, and may re-encode the one or more data signals 360 to use as PTRS pilot symbols for estimating phase noise error for the transmission layer 310. In some cases, the UE 115 may transmit a phase noise error estimation report to the network entity 105, which may indicate the phase noise error for the transmission layer 305, the transmission layer 310, or both (e.g., a common phase noise error estimation or an uncommon phase noise error estimation).

Additionally, or alternatively, the network entity 105 may transmit data via the transmission layer 310 using multiple transport blocks (e.g., if phase noise is uncommon between the transmission layer 305 and the transmission layer 310). That is, the UE 115 may receive a first subset of the data signaling 360 on the transmission layer 310 via a first transport block according to a first MCS, and may receive a second subset of the data signaling 360 on the transmission layer 310 via a second transport block and the subcarriers 370-*a* according to a second MCS that is lower than the first MCS (e.g., to use for PTRS pilot symbols). Using the second MCS (e.g., a lower MCS) may support a high likelihood of successfully decoding the second transport block (e.g., without correcting phase noise error). Having received the second TB at the lower MCS, the UE 115 may reencode the second TB, and may use the received and reencoded data signaling as a PTRS pilot, which may support correcting phase noise error for the second transmission layer 310. In some cases, the UE 115 may identify a CRC corresponding to the second transport block (e.g., a low MCS data transmission may be associated with its own CRC attached to the data transmission such as the second TB), and may decode the second transport block according to a code (such as a convolution code, a polar code, or a low density polar code, among other examples), which may support decoding the transport block without relying on interleaving procedures.

In some examples, UE 115 may determine that the CRC does not pass (e.g., fails) for the second transport block, and may transmit a feedback message to the network entity 105 requesting a retransmission or repetition of the transport block. For example, the data signals 360 at the subcarriers 370 on the transmission layer 310 (e.g., corresponding to PTRS subcarriers at the transmission layer 305) may be associated with a feedback bit (e.g., an ACK or NACK bit) without an associated HARQ process (e.g., without an associated repetition), and the UE 115 may transmit the feedback message using the feedback bit (e.g., indicating ACK or NACK). In some cases, due to the transport block being associated with a relatively lower MCS, the network entity 105 may retransmit or repeat the second transport block (e.g., independent of a HARQ process) in response to the feedback message indicating a NACK. For example, if a CRC fails, a simple repetition may be applied to the second TB.

In some cases, the network entity 105 may transmit a control signal (e.g., the control signal 205 as described with reference to FIG. 2) indicating a configuration of the multi-layer PTRS signaling to the UE 115. The network entity 105 may (e.g., via such control signaling) toggle between approaches (e.g., depending on reported or experienced SNR of current or previous signaling). For example, the UE 115 may receive a control signal (e.g., a DCI message or an RRC message) indicating one or more parameters associated with the multi-layer PTRS signaling, such as the set of subcarriers corresponding to each transmission layer, a first MCS associated with the transmission layer 305, a second MCS associated with the transmission layer 310, the subcarriers 370 associated with PTRS transmissions 365 or data signals 360, or any combination thereof.

Additionally, or alternatively, the network entity 105 may configure the multi-layer PTRS signaling according to a capability of the UE 115. For example, the UE 115 may transmit a capability report to the network entity 105 indicating one or more capabilities of the UE. In some cases, the capability report may include an indication of a signal to noise ratio (SNR) supported by the UE 115, a phase noise mask, a phase noise estimate, or both determined by the UE 115, a request for a transmission rank associated with the first transmission layer and the second transmission layer, a threshold difference between the first MCS associated with the transmission layer 305 and the second MCS associated with the transmission layer 310, or any combination thereof. The network entity 105 may activate (e.g., toggle) the configuration at the UE via a DCI message (e.g., one or more bits indicating the different MCSs), or may indicate the configuration via an RRC message.

For instance, in some examples, the UE may indicate (e.g., via the capability signaling) that it experiences sufficient processing gain to use a low MCS approach (e.g., data signaling on the transmission layer 310 via subcarriers 370 may be transmitted at a low MCS and used by the UE 115 as PTRS pilots). Per the UE capability, the network entity 105 may indicate to the UE (e.g., via several bits in the DCI, or an additional DCI field) that the low MCS data approach described herein is enabled, an MCS difference (e.g., between the MCS for the rest of the data signaling or a first TB, and the low MCS for the data signaling via the subcarriers 370 to be reencoded and used as a PTRS pilot). The various approaches, threshold or candidate differences between MCSs, or both, may be defined (e.g., preconfigured or configured at the UE 115, or defined in one or more standards documents, or a combination thereof). In some examples, the UE 115 may report its phase noise mask, integrated phase noise estimate, or a combination thereof, to the network entity 105, and the network entity 105 may select an approach (e.g., constant MCS across all subcarriers on the second layer 310, or the low MCS approach for subcarriers 370) based thereon. In some examples, the UE 115 may transmit a requested rank, or a requested MCS difference between the first TB and the second TB (e.g., between the subcarriers 370 and the other subcarriers on the second transmission layer 310). In such examples, the network entity may configure the UE with an MCS approach (e.g., based on the requested rank and MCS difference). In some examples, rank and MCS differences may be predefined in RRC signaling with a constant difference, a threshold (e.g., maximum) MCS limit, or any combination thereof.

Figure 4:
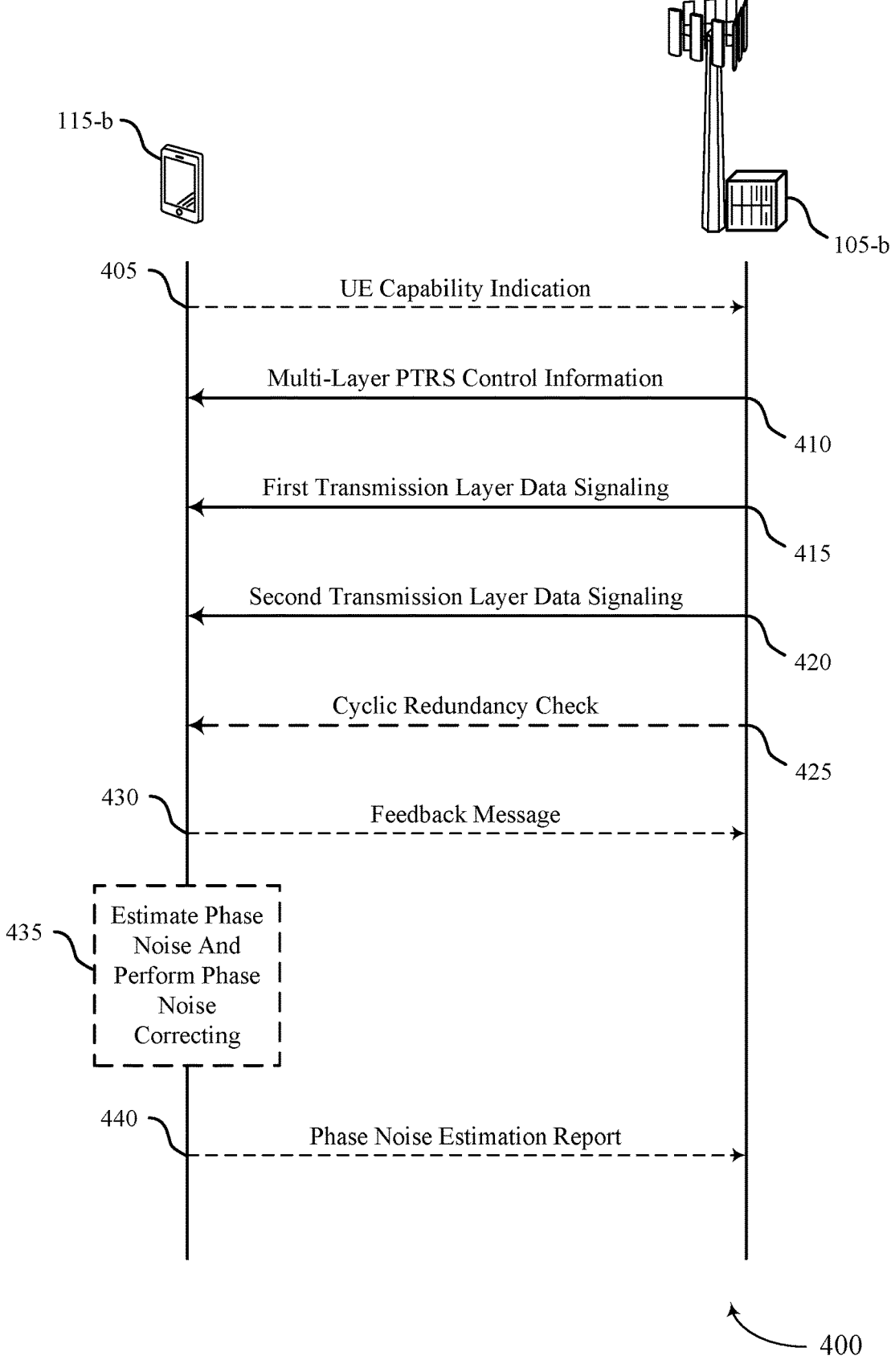
FIG. 4 illustrates an example of a process flow that supports phase tracking reference signaling and data modulation for multiple layers in accordance with one or more aspects of the present disclosure.

FIG. 4 illustrates an example of a process flow 400 that supports phase tracking reference signaling and data modulation for multiple layers in accordance with one or more aspects of the present disclosure. In some examples, the process flow 400 may implement aspects of the wireless communications system 100, the wireless communications system 200, and the transmission configuration 300. For example, the process flow 400 may include a network entity 105-*b* and a UE 115-*b*, which may be respective examples of a network entity 105 and a UE 115 as described with reference to FIG. 1. The process flow 400 may illustrate an example of a network entity 105-*a* performing multi-layer PTRS transmissions, as described with reference to FIGS. 2 and 3. Alternative examples of the following may be implemented, where some processes are performed in a different order than described or are not performed. In some cases, processes may include additional features not mentioned below, or further processes may be added.

At 405, the UE 115-b may transmit, to the network entity 105-b, a UE capability indication. For example, the UE 115-b may report an indication of an SNR supported by the UE 115-b, a phase noise mask, a phase noise estimate, or both determined by the UE 115-b, a request for a transmission rank associated with a first transmission layer and a second transmission layer, a threshold difference between a first MCS associated with the first transmission layer and a second MCS associated with the second transmission layer, or any combination thereof. In some cases, the network entity 105-b may configure the multi-layer PTRS transmissions based on receiving the UE capability indication.

At 410, the network entity 105-b may transmit, to the UE 115-b, a multi-layer PTRS control information signal. In some examples, the multi-layer PTRS control information may be an activation message (e.g., a DCI message), or a higher layer indication (e.g., an RRC message). The multi-layer PTRS control information include an indication of the multi-layer phase tracking reference signaling, a first modulation and coding scheme associated with the first transmission layer and a second modulation and coding scheme associated with the second transmission layer, or both.

At 415, the network entity 105-b may transmit, to the UE 115-b, first transmission layer data signaling. That is, the network entity 105-b may transmit a signal (e.g., a DFT-s-OFDM waveform) via the first transmission layer, which may include a set of subcarriers corresponding to data signaling, PTRS transmissions, or both. In some cases, the network entity 105-b may transmit the data signaling and PTRS transmissions at a same power level via the first transmission layer.

At 420, the network entity 105-b may transmit, to the UE 115-b, second transmission layer data signaling. That is, the network entity 105-b may transmit a signal (e.g., a DFT-s-OFDM waveform) via the second transmission layer, which may include a set of subcarriers corresponding to data signaling. In some cases, the network entity 105-b may transmit the data signaling via the second transmission layer at a same power level as transmissions via the first transmission layer. In some examples, the network entity 105-b may transmit data signals using a lower MCS value (e.g., a TB in the PTRS subcarriers may be transmitted at a lower MCS than a TB transmitted via the other subcarriers of the second transmission layer), which the UE 115-b may use as PTRS pilot symbols for phase noise estimation.

At 425, the network entity 105-b may optionally transmit, to the UE 115-b, a cyclic redundancy check associated with data signaling via the second transmission layer. In some examples, the UE 115-b may decode a transport block associated with the data signaling via the second transmission layer using a convolution code, a polar code, or a low density polar code, or any other code.

At 430, the UE 115-b may optionally transmit, to the network entity 105-b, a feedback message based on receiving the cyclic redundancy check. For example, the UE 115-b determine that the cyclic redundancy check does not pass for the second transport block, and may transmit a feedback message using a feedback bit associated with the transport block. In some cases, the network entity 105-b may retransmit or repeat the transport block in response to the feedback message.

At 435, the UE 115-b may optionally estimate phase noise and perform phase noise correcting. In some cases, the UE 115-b may use the first layer data signaling and the second layer data signaling to estimate phase noise. For example, the UE 115-b may use the PTRS transmissions received via the first layer to estimate a common phase noise for both the first transmission layer and the second transmission layer. Alternatively, the UE 115-b may estimate a first phase noise for the first transmission layer using the PTRS transmissions, and may estimate a second phase noise for the second transmission layer using data signals transmitted via the PTRS subcarriers of the second transmission layer according to a lower MCS (e.g., decoding the data signals, reencoding the data signals, and using the reencoded data signals as PTRS pilot symbols). The UE 115-b may then perform phase noise correction for the second transmission layer based on the estimated phase noise for the second transmission layer.

At 440, the UE 115-b may transmit, to the network entity 105-b, a phase noise estimation report. The phase noise estimation report may indicate the estimated phase noise for each transmission layer, which may support phase noise correction at the network entity 105-b.

Figure 5:
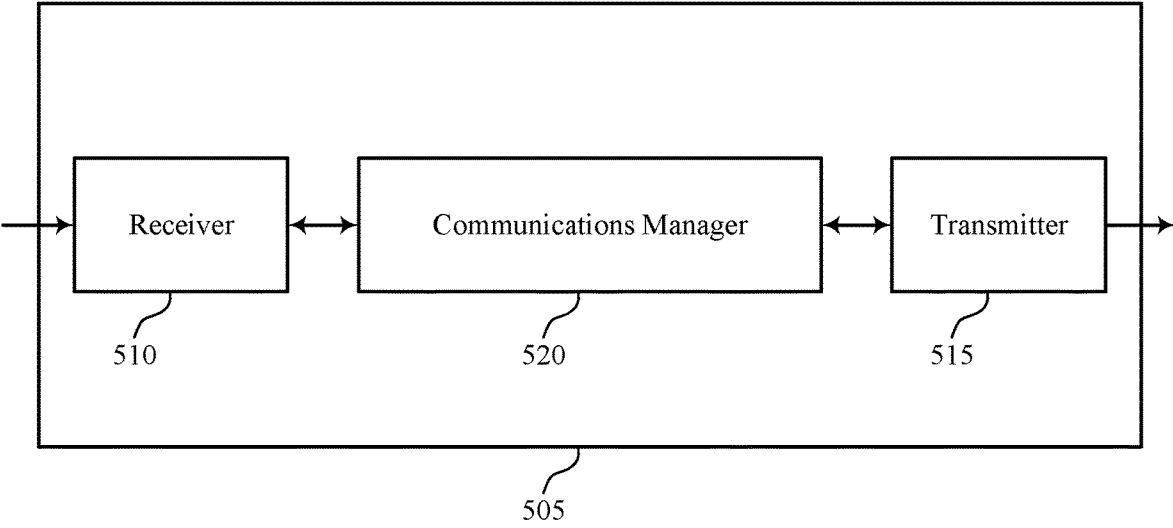
FIGS. 5 and 6 show block diagrams of devices that support phase tracking reference signaling and data modulation for multiple layers in accordance with one or more aspects of the present disclosure.

FIG. 5 shows a block diagram 500 of a device 505 that supports phase tracking reference signaling and data modulation for multiple layers in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to phase tracking reference signaling and data modulation for multiple layers). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to phase tracking reference signaling and data modulation for multiple layers). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of phase tracking reference signaling and data modulation for multiple layers as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving signaling including control information associated with multi-layer phase tracking reference signaling. The communications manager 520 may be configured as or otherwise support a means for receiving, according to the control information and via a first transmission layer, data signaling via a first set of subcarriers and one or more phase tracking reference signals via a second set of subcarriers. The communications manager 520 may be configured as or otherwise support a means for receiving, according to the control information and via a second transmission layer, the data signaling via the first set of subcarriers and the second set of subcarriers, where a first average energy associated with the one or more phase tracking reference signals is correlated with a second average energy associated with the data signaling. For example, a difference between a first average energy associated with the one or more phase tracking reference signals and a second average energy associated with the data signaling may satisfy an average energy threshold.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reducing PAPR associated with PTRS transmissions and increasing throughput of multi-layer signaling, thereby increasing the rate of data transfer, reducing power consumption of a wireless device, and improving user experience.

Figure 6:
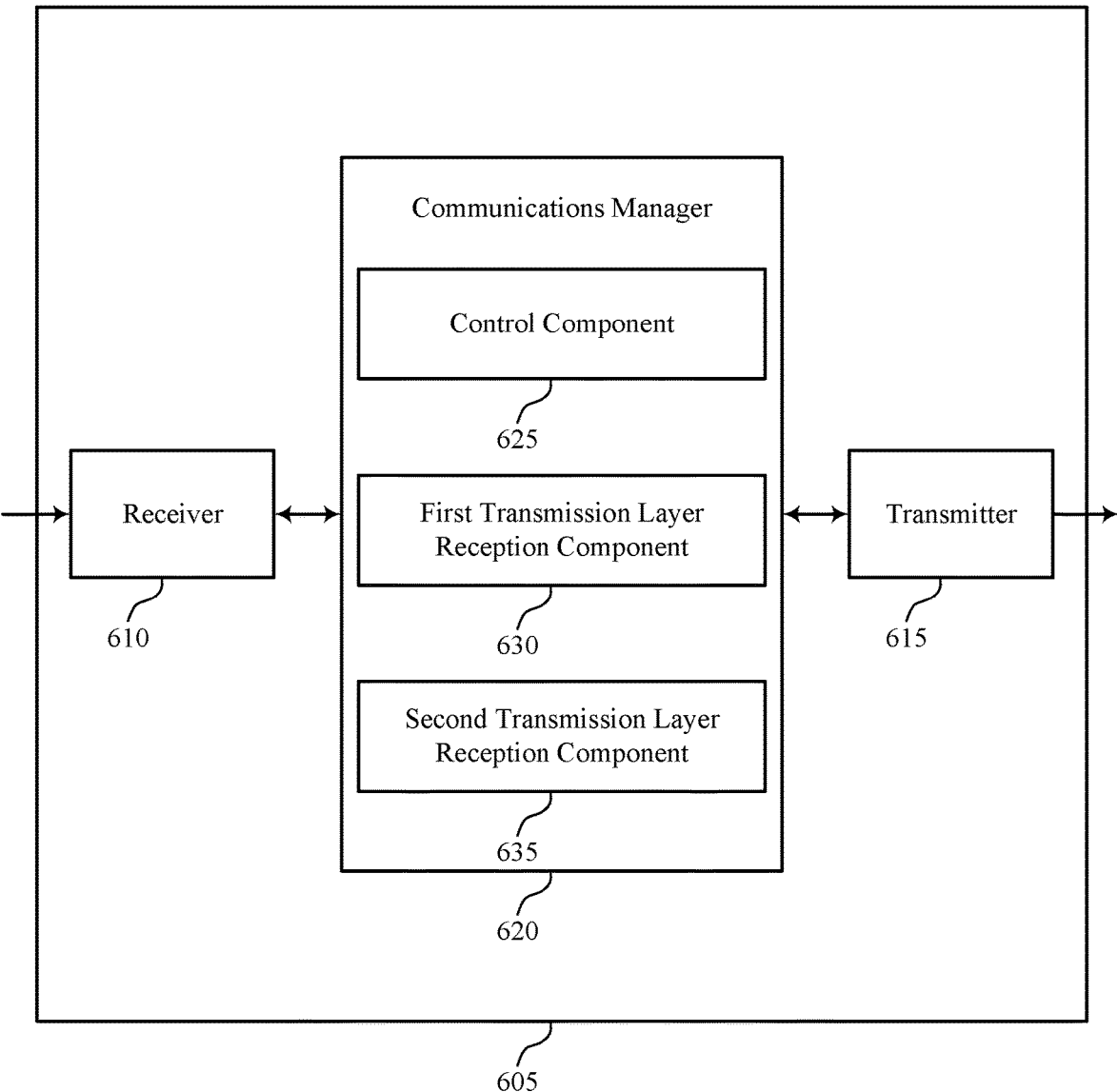

FIG. 6 shows a block diagram 600 of a device 605 that supports phase tracking reference signaling and data modulation for multiple layers in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to phase tracking reference signaling and data modulation for multiple layers). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to phase tracking reference signaling and data modulation for multiple layers). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of phase tracking reference signaling and data modulation for multiple layers as described herein. For example, the communications manager 620 may include a control component 625, a first transmission layer reception component 630, a second transmission layer reception component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The control component 625 may be configured as or otherwise support a means for receiving signaling including control information associated with multi-layer phase tracking reference signaling. The first transmission layer reception component 630 may be configured as or otherwise support a means for receiving, according to the control information and via a first transmission layer, data signaling via a first set of subcarriers and one or more phase tracking reference signals via a second set of subcarriers. The second transmission layer reception component 635 may be configured as or otherwise support a means for receiving, according to the control information and via a second transmission layer, the data signaling via the first set of subcarriers and the second set of subcarriers, where a first average energy associated with the one or more phase tracking reference signals is correlated with a second average energy associated with the data signaling. For example, a difference between a first average energy associated with the one or more phase tracking reference signals and a second average energy associated with the data signaling satisfies an average energy threshold.

Figure 7:
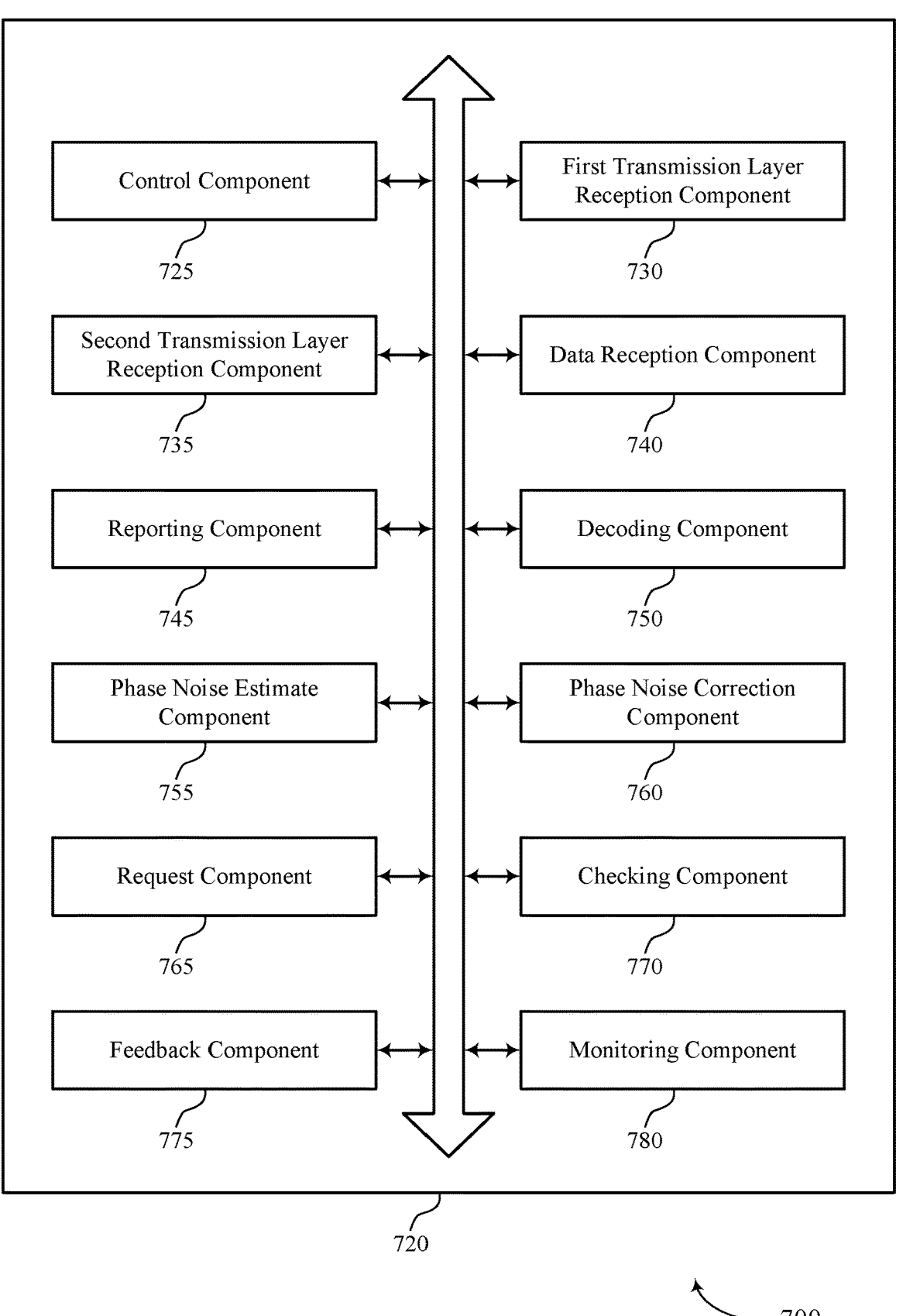
FIG. 7 shows a block diagram of a communications manager that supports phase tracking reference signaling and data modulation for multiple layers in accordance with one or more aspects of the present disclosure.

FIG. 7 shows a block diagram 700 of a communications manager 720 that supports phase tracking reference signaling and data modulation for multiple layers in accordance with one or more aspects of the present disclosure. The communications manager 720 may be an example of aspects of a communications manager 520, a communications manager 620, or both, as described herein. The communications manager 720, or various components thereof, may be an example of means for performing various aspects of phase tracking reference signaling and data modulation for multiple layers as described herein. For example, the communications manager 720 may include a control component 725, a first transmission layer reception component 730, a second transmission layer reception component 735, a data reception component 740, a reporting component 745, a decoding component 750, a phase noise estimate component 755, a phase noise correction component 760, a request component 765, a checking component 770, a feedback component 775, a monitoring component 780, or any combination thereof. Each of these components may communicate, directly or indirectly, with one another (e.g., via one or more buses).

The communications manager 720 may support wireless communications at a UE in accordance with examples as disclosed herein. The control component 725 may be configured as or otherwise support a means for receiving signaling including control information associated with multi-layer phase tracking reference signaling. The first transmission layer reception component 730 may be configured as or otherwise support a means for receiving, according to the control information and via a first transmission layer, data signaling via a first set of subcarriers and one or more phase tracking reference signals via a second set of subcarriers. The second transmission layer reception component 735 may be configured as or otherwise support a means for receiving, according to the control information and via a second transmission layer, the data signaling via the first set of subcarriers and the second set of subcarriers, where a first average energy associated with the one or more phase tracking reference signals is correlated with a second average energy associated with the data signaling.

In some examples, to support receiving the data signaling via the second transmission layer, the data reception component 740 may be configured as or otherwise support a means for receiving first data signaling via a first transport block according to a first modulation and coding scheme. In some examples, to support receiving the data signaling via the second transmission layer, the data reception component 740 may be configured as or otherwise support a means for receiving second data signaling via a second transport block according to a second modulation and coding scheme, where the second modulation and coding scheme has a lower value than the first modulation and coding scheme.

In some examples, the data reception component 740 may be configured as or otherwise support a means for receiving, in the second data signaling, a cyclic redundancy check corresponding to the second transport block. In some examples, the decoding component 750 may be configured as or otherwise support a means for decoding the second transport block according to a convolution code, a polar code, or a low density polar code, where receiving the second data signaling is based on the decoding.

In some examples, the checking component 770 may be configured as or otherwise support a means for determining that the cyclic redundancy check does not pass for the second transport block. In some examples, the feedback component 775 may be configured as or otherwise support a means for transmitting a feedback message using a feedback bit associated with the second transport block based on the determining. In some examples, the monitoring component 780 may be configured as or otherwise support a means for monitoring for a retransmission or a repetition of the second transport block based on transmitting the feedback message, where receiving the second data signaling is based on the monitoring.

In some examples, the phase noise estimate component 755 may be configured as or otherwise support a means for estimating a first phase noise error for the first transmission layer based on the one or more phase tracking reference signals. In some examples, the phase noise correction component 760 may be configured as or otherwise support a means for performing phase noise correcting for the first data signaling based on the first phase noise error. In some examples, the phase noise estimate component 755 may be configured as or otherwise support a means for estimating a phase noise error for the second transmission layer based on decoding and re-encoding the second data signaling. In some examples, the phase noise correction component 760 may be configured as or otherwise support a means for performing phase noise correction for the second data signaling based on the second phase noise error.

In some examples, to support receiving the data signaling via the second transmission layer, the data reception component 740 may be configured as or otherwise support a means for receiving the data signaling via the first set of subcarriers and the second set of subcarriers according to a first modulation and coding scheme, where a first phase noise error is associated with both the first transmission layer and the second transmission layer.

In some examples, the phase noise estimate component 755 may be configured as or otherwise support a means for estimating a first phase noise error for the first transmission layer based on the one or more phase tracking reference signals. In some examples, the phase noise correction component 760 may be configured as or otherwise support a means for performing phase noise correcting for the first data signaling based on the first phase noise error. In some examples, the phase noise correction component 760 may be configured as or otherwise support a means for performing phase noise correction for the second data signaling based on the first phase noise error.

In some examples, the reporting component 745 may be configured as or otherwise support a means for transmitting, responsive to receiving the data signaling via the first transmission layer and the second transmission layer, a phase noise error estimation report.

In some examples, to support receiving the control signaling, the control component 725 may be configured as or otherwise support a means for receiving a control message including an indication of the multi-layer phase tracking reference signaling, a first modulation and coding scheme associated with the first transmission layer and a second modulation and coding scheme associated with the second transmission layer.

In some examples, the reporting component 745 may be configured as or otherwise support a means for transmitting an indication of a signal to noise ratio supported by the UE, where receiving the control message is based on the signal to noise ratio satisfying a threshold.

In some examples, the reporting component 745 may be configured as or otherwise support a means for transmitting an indication of a phase noise mask, a phase noise estimate, or both, where receiving the control message is based on the phase noise mask, the phase noise estimate, or both.

In some examples, the request component 765 may be configured as or otherwise support a means for transmitting a request for a transmission rank associated with the first transmission layer and the second transmission layer, a threshold difference between the first modulation and coding scheme and the second modulation and coding scheme, or both, where receiving the control message is based on the transmission rank, the threshold difference, or both.

In some examples, the control message includes a radio resource control message including one or more parameters associated with the multi-layer phase tracking reference signaling configuration.

In some examples, the control message includes a down-link control information message activating the multi-layer phase tracking reference signaling configuration.

In some examples, the first average energy is correlated with the second average energy such that a difference between the first average energy and the second average energy satisfies an average energy threshold.

Figure 8:
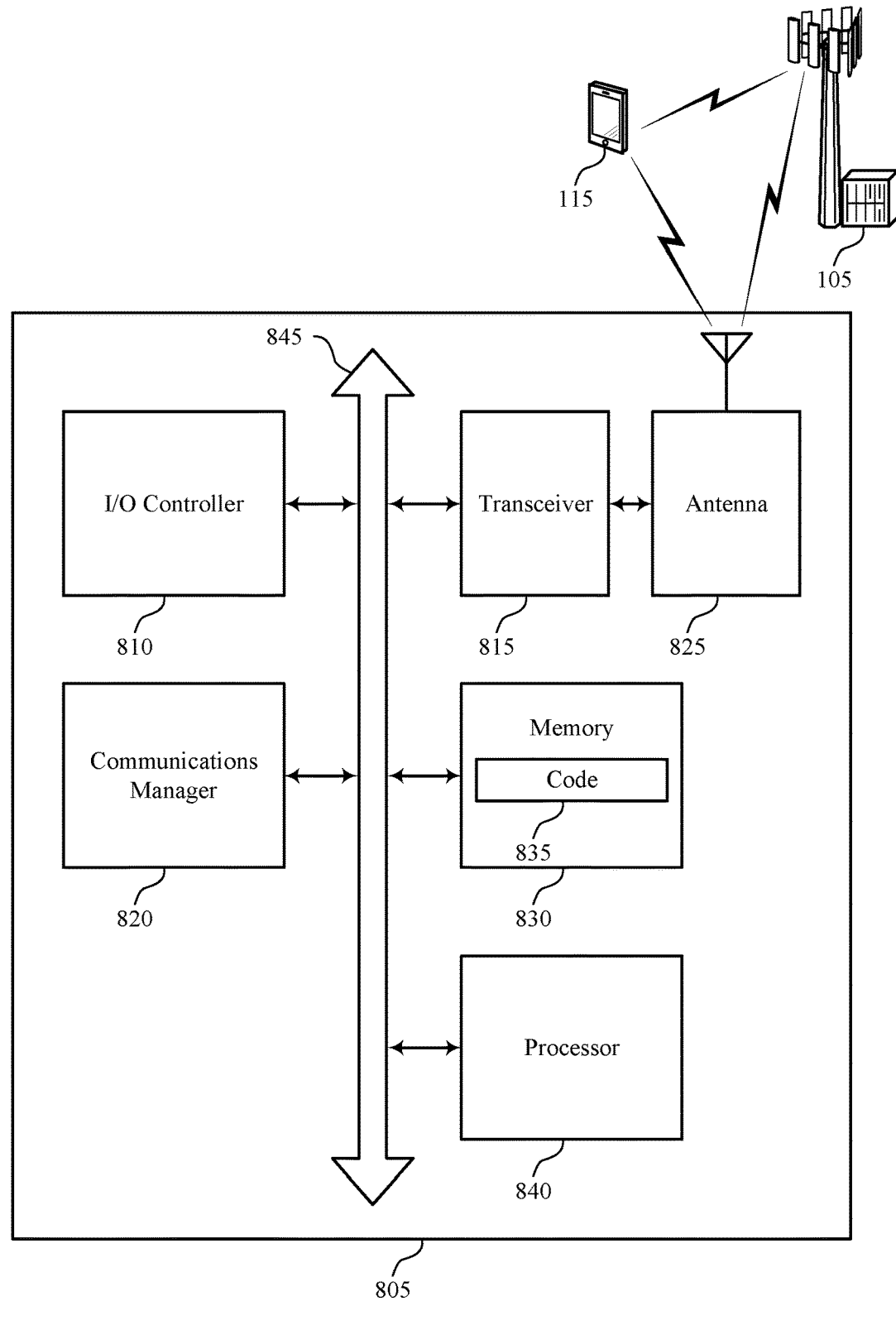
FIG. 8 shows a diagram of a system including a device that supports phase tracking reference signaling and data modulation for multiple layers in accordance with one or more aspects of the present disclosure.

FIG. 8 shows a diagram of a system 800 including a device 805 that supports phase tracking reference signaling and data modulation for multiple layers in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communica-tions including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, func-tionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a proces-sor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the trans-ceiver 815 may represent a wireless transceiver and may communicate bi-directionally with another wireless trans-ceiver. The transceiver 815 may also include a modem to modulate the packets, to provide the modulated packets to one or more antennas 825 for transmission, and to demodu-late packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the pro-cessor 840, cause the device 805 to perform various func-tions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or soft-ware operation such as the interaction with peripheral com-ponents or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting phase tracking reference signaling and data modulation for mul-tiple layers). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving signaling including control information associated with multi-layer phase tracking reference signaling. The communications manager 820 may be configured as or otherwise support a means for receiving, according to the control information and via a first transmission layer, data signaling via a first set of subcarriers and one or more phase tracking reference signals via a second set of subcarriers. The communications manager 820 may be configured as or otherwise support a means for receiving, according to the control information and via a second transmission layer, the data signaling via the first set of subcarriers and the second set of subcarriers, where a first average energy associated with the one or more phase tracking reference signals is correlated with a second average energy associated with the data signaling.

By including or configuring the communications manager 820 in accordance with examples as described herein, the device 805 may support techniques for reducing PAPR associated with PTRS transmissions and increasing through-put of multi-layer signaling, thereby increasing the rate of data transfer, reducing power consumption of a wireless device, and improving user experience.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of phase tracking reference signaling and data modulation for multiple layers as described herein, or the processor 840 and the memory 830 may be otherwise configured to perform or support such operations.

Figure 9:
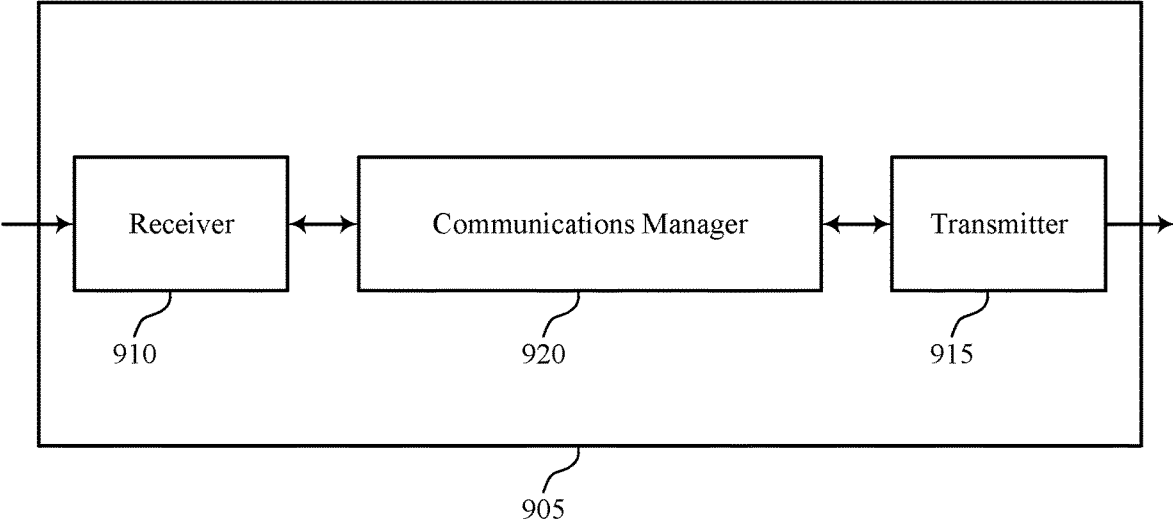
FIGS. 9 and 10 show block diagrams of devices that support phase tracking reference signaling and data modulation for multiple layers in accordance with one or more aspects of the present disclosure.

FIG. 9 shows a block diagram 900 of a device 905 that supports phase tracking reference signaling and data modulation for multiple layers in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of phase tracking reference signaling and data modulation for multiple layers as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for outputting signaling including control information associated with multi-layer phase tracking reference signaling. The communications manager 920 may be configured as or otherwise support a means for outputting, according to the control information and via a first transmission layer, data signaling at a first power level via a first set of subcarriers and one or more phase tracking reference signals at the first power level via a second set of subcarriers. The communications manager 920 may be configured as or otherwise support a means for outputting, according to the control information and via a second transmission layer, the data signaling at the first power level via the first set of subcarriers and the second set of subcarriers.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reducing PAPR associated with PTRS transmissions and increasing throughput of multi-layer signaling, thereby increasing the rate of data transfer, reducing power consumption of a wireless device, and improving user experience.

Figure 10:
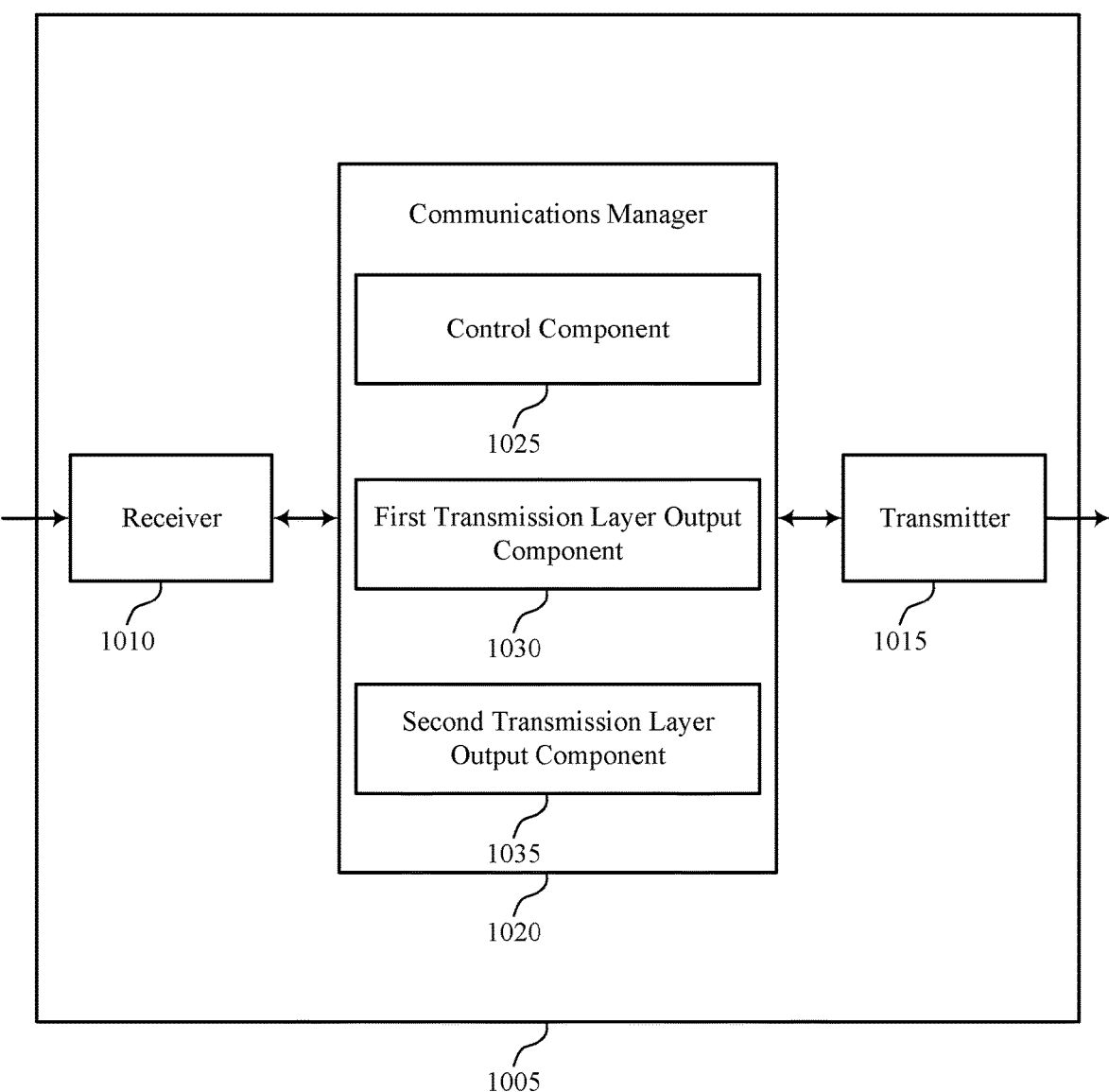

FIG. 10 shows a block diagram 1000 of a device 1005 that supports phase tracking reference signaling and data modulation for multiple layers in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of phase tracking reference signaling and data modulation for multiple layers as described herein. For example, the communications manager 1020 may include a control component 1025, a first transmission layer output component 1030, a second transmission layer output component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The control component 1025 may be configured as or otherwise support a means for outputting signaling including control information associated with multi-layer phase tracking reference signaling.

The first transmission layer output component 1030 may be configured as or otherwise support a means for outputting, according to the control information and via a first transmission layer, data signaling at a first power level via a first set of subcarriers and one or more phase tracking reference signals at the first power level via a second set of subcarriers. The second transmission layer output component 1035 may be configured as or otherwise support a means for outputting, according to the control information and via a second transmission layer, the data signaling at the first power level via the first set of subcarriers and the second set of subcarriers.

Figure 11:
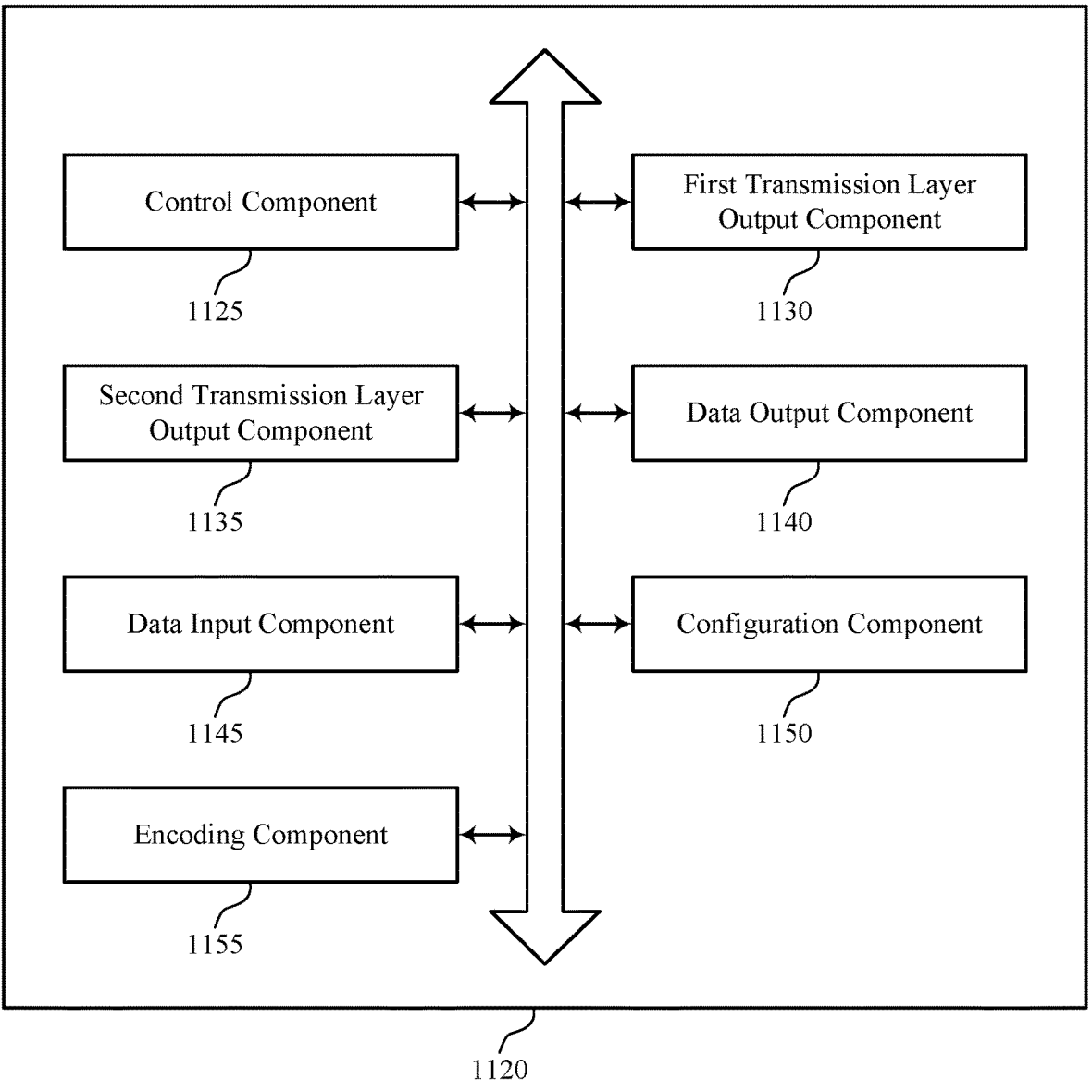
FIG. 11 shows a block diagram of a communications manager that supports phase tracking reference signaling and data modulation for multiple layers in accordance with one or more aspects of the present disclosure.

FIG. 11 shows a block diagram 1100 of a communications manager 1120 that supports phase tracking reference signaling and data modulation for multiple layers in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of phase tracking reference signaling and data modulation for multiple layers as described herein. For example, the communications manager 1120 may include a control component 1125, a first transmission layer output component 1130, a second transmission layer output component 1135, a data output component 1140, a data input component 1145, a configuration component 1150, an encoding component 1155, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The control component 1125 may be configured as or otherwise support a means for outputting signaling including control information associated with multi-layer phase tracking reference signaling. The first transmission layer output component 1130 may be configured as or otherwise support a means for outputting, according to the control information and via a first transmission layer, data signaling at a first power level via a first set of subcarriers and one or more phase tracking reference signals at the first power level via a second set of subcarriers. The second transmission layer output component 1135 may be configured as or otherwise support a means for outputting, according to the control information and via a second transmission layer, the data signaling at the first power level via the first set of subcarriers and the second set of subcarriers.

In some examples, to support outputting the data signaling via the second transmission layer, the data output component 1140 may be configured as or otherwise support a means for outputting first data signaling via a first transport block according to a first modulation and coding scheme. In some examples, to support outputting the data signaling via the second transmission layer, the data output component 1140 may be configured as or otherwise support a means for outputting second data signaling via a second transport block according to a second modulation and coding scheme, where the second modulation and coding scheme has a lower value than the first modulation and coding scheme.

In some examples, the configuration component 1150 may be configured as or otherwise support a means for including, in the second data signaling, a cyclic redundancy check corresponding to the second transport block. In some examples, the encoding component 1155 may be configured as or otherwise support a means for encoding the second transport block according to a convolution code, a polar code, or a low density polar code, where outputting the second data signaling is based on the encoding.

In some examples, to support outputting the data signaling via the first set of subcarriers and the second set of subcarriers, the data output component 1140 may be configured as or otherwise support a means for outputting the data signaling via the first set of subcarriers and the second set of subcarriers according to a first modulation and coding scheme, where a first phase noise error is associated with both the first transmission layer and the second transmission layer.

In some examples, the data input component 1145 may be configured as or otherwise support a means for obtaining, from at least one user equipment responsive to outputting the data signaling via the first transmission layer and the second transmission layer, a phase noise error estimation report.

In some examples, to support outputting the control signaling, the control component 1125 may be configured as or otherwise support a means for outputting a control message including an indication of the multi-layer phase tracking reference signaling, a first modulation and coding scheme associated with the first transmission layer, and a second modulation and coding scheme associated with the second transmission layer.

In some examples, the data input component 1145 may be configured as or otherwise support a means for obtaining, from a UE, an indication of a signal to noise ratio supported by the UE, where outputting the control message is based on the signal to noise ratio satisfying a threshold.

In some examples, the data input component 1145 may be configured as or otherwise support a means for obtaining, from a UE, an indication of a phase noise mask, a phase noise estimate, or both, where outputting the control message is based on the phase noise mask, the phase noise estimate, or both.

In some examples, the data input component 1145 may be configured as or otherwise support a means for obtaining, from a UE, a request for a transmission rank associated with the first transmission layer and the second transmission layer, a threshold difference between the first modulation and coding scheme and the second modulation and coding scheme, or both, where outputting the control message is based on the transmission rank, the threshold difference, or both.

In some examples, the control message includes a radio resource control message including one or more parameters associated with the multi-layer phase tracking reference signaling.

In some examples, the control message includes a downlink control information message activating the multi-layer phase tracking reference signaling.

In some examples, the first average energy is correlated with the second average energy such that a difference between the first average energy and the second average energy satisfies an average energy threshold.

Figure 12:
FIG. 12 shows a diagram of a system including a device that supports phase tracking reference signaling and data modulation for multiple layers in accordance with one or more aspects of the present disclosure.

FIG. 12 shows a diagram of a system 1200 including a device 1205 that supports phase tracking reference signaling and data modulation for multiple layers in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting phase tracking reference signaling and data modulation for multiple layers). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for outputting signaling including control information associated with multi-layer phase tracking reference signaling. The communications manager 1220 may be configured as or otherwise support a means for outputting, according to the control information and via a first transmission layer, data signaling at a first power level via a first set of subcarriers and one or more phase tracking reference signals at the first power level via a second set of subcarriers. The communications manager 1220 may be configured as or otherwise support a means for outputting, according to the control information and via a second transmission layer, the data signaling at the first power level via the first set of subcarriers and the second set of subcarriers.

By including or configuring the communications manager 1220 in accordance with examples as described herein, the device 1205 may support techniques for reducing PAPR associated with PTRS transmissions and increasing throughput of multi-layer signaling, thereby increasing the rate of data transfer, reducing power consumption of a wireless device, and improving user experience.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of phase tracking reference signaling and data modulation for multiple layers as described herein, or the processor 1235 and the memory 1225 may be otherwise configured to perform or support such operations.

FIG. 13 shows a flowchart illustrating a method 1300 that supports phase tracking reference signaling and data modulation for multiple layers in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving signaling including control information associated with multi-layer phase tracking reference signaling. The operations of 1305 may be performed in accordance with examples as disclosed herein. In some examples, aspects of the operations of 1305 may be performed by a control component 725 as described with reference to FIG. 7.

At 1310, the method may include receiving, according to the control information and via a first transmission layer, data signaling via a first set of subcarriers and one or more phase tracking reference signals via a second set of subcarriers. The operations of 1310 may be performed in accordance with examples as disclosed herein. In some examples, aspects of the operations of 1310 may be performed by a first transmission layer reception component 730 as described with reference to FIG. 7.

At 1315, the method may include receiving, according to the control information and via a second transmission layer, the data signaling via the first set of subcarriers and the second set of subcarriers, where a first average energy associated with the one or more phase tracking reference signals is correlated with a second average energy associated with the data signaling. The operations of 1315 may be performed in accordance with examples as disclosed herein. In some examples, aspects of the operations of 1315 may be performed by a second transmission layer reception component 735 as described with reference to FIG. 7.

FIG. 14 shows a flowchart illustrating a method 1400 that supports phase tracking reference signaling and data modulation for multiple layers in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include outputting signaling including control information associated with multi-layer phase tracking reference signaling. The operations of 1405 may be performed in accordance with examples as disclosed herein. In some examples, aspects of the operations of 1405 may be performed by a control component 1125 as described with reference to FIG. 11.

At 1410, the method may include outputting, according to the control information and via a first transmission layer, data signaling at a first power level via a first set of subcarriers and one or more phase tracking reference signals at the first power level via a second set of subcarriers. The operations of 1410 may be performed in accordance with examples as disclosed herein. In some examples, aspects of the operations of 1410 may be performed by a first transmission layer output component 1130 as described with reference to FIG. 11.

At 1415, the method may include outputting, according to the control information and via a second transmission layer, the data signaling at the first power level via the first set of subcarriers and the second set of subcarriers. The operations of 1415 may be performed in accordance with examples as disclosed herein. In some examples, aspects of the operations of 1415 may be performed by a second transmission layer output component 1135 as described with reference to FIG. 11.

The following provides an overview of aspects of the present disclosure:

Aspect 1: A method for wireless communications at a UE, comprising: receiving signaling comprising control information associated with multi-layer phase tracking reference signaling; receiving, according to the control information and via a first transmission layer, data signaling via a first set of subcarriers and one or more phase tracking reference signals via a second set of subcarriers; and receiving, according to the control information and via a second transmission layer, the data signaling via the first set of subcarriers and the second set of subcarriers, wherein a first average energy associated with the one or more phase tracking reference signals is correlated with a second average energy associated with the data signaling.

Aspect 2: The method of aspect 1, wherein receiving the data signaling via the second transmission layer comprises: receiving first data signaling via a first transport block according to a first modulation and coding scheme; and receiving second data signaling via a second transport block according to a second modulation and coding scheme, wherein the second modulation and coding scheme has a lower value than the first modulation and coding scheme.

Aspect 3: The method of aspect 2, further comprising: receiving, in the second data signaling, a cyclic redundancy check corresponding to the second transport block; and decoding the second transport block according to a convolution code, a polar code, or a low density polar code, wherein receiving the second data signaling is based at least in part on the decoding.

Aspect 4: The method of aspect 3, further comprising: determining that the cyclic redundancy check does not pass for the second transport block; transmitting a feedback message using a feedback bit associated with the second transport block based at least in part on the determining; and monitoring for a retransmission or a repetition of the second transport block based at least in part on transmitting the feedback message, wherein receiving the second data signaling is based at least in part on the monitoring.

Aspect 5: The method of aspect 2, further comprising: estimating a first phase noise error for the first transmission layer based at least in part on the one or more phase tracking reference signals; performing phase noise correcting for the first data signaling based at least in part on the first phase noise error; estimating a phase noise error for the second transmission layer based at least in part on the second data signaling; and performing phase noise correction for the second data signaling based at least in part on the second phase noise error.

Aspect 6: The method of any of aspect 1, wherein receiving the data signaling via the second transmission layer comprises: receiving the data signaling via the first set of subcarriers and the second set of subcarriers according to a first modulation and coding scheme, wherein a first phase noise error is associated with both the first transmission layer and the second transmission layer.

Aspect 7: The method of aspect 6, further comprising: estimating a first phase noise error for the first transmission layer based at least in part on the one or more phase tracking reference signals; performing phase noise correcting for the first data signaling based at least in part on the first phase noise error; and performing phase noise correction for the second data signaling based at least in part on the first phase noise error.

Aspect 8: The method of any of aspects 1 through 7, further comprising: transmitting, responsive to receiving the data signaling via the first transmission layer and the second transmission layer, a phase noise error estimation report.

Aspect 9: The method of any of aspects 1 through 8, wherein receiving the control signaling comprises: receiving a control message comprising an indication of the multi-layer phase tracking reference signaling, a first modulation and coding scheme associated with the first transmission layer and a second modulation and coding scheme associated with the second transmission layer.

Aspect 10: The method of aspect 9, further comprising: transmitting an indication of a signal to noise ratio supported by the UE, wherein receiving the control message is based at least in part on the signal to noise ratio satisfying a threshold.

Aspect 11: The method of any of aspects 9 through 10, further comprising: transmitting an indication of a phase noise mask, a phase noise estimate, or both, wherein receiving the control message is based at least in part on the phase noise mask, the phase noise estimate, or both.

Aspect 12: The method of any of aspects 9 through 11, further comprising: transmitting a request for a transmission rank associated with the first transmission layer and the second transmission layer, a threshold difference between the first modulation and coding scheme and the second modulation and coding scheme, or both, wherein receiving the control message is based at least in part on the transmission rank, the threshold difference, or both.

Aspect 13: The method of any of aspects 9 through 12, wherein the control message comprises a radio resource control message comprising one or more parameters associated with the multi-layer phase tracking reference signaling configuration.

Aspect 14: The method of any of aspects 9 through 12, wherein the control message comprises a downlink control information message activating the multi-layer phase tracking reference signaling configuration.

Aspect 15: The method of any of aspects 1 through 14, wherein the first average energy is correlated with the second average energy such that a difference between the first average energy and the second average energy satisfies an average energy threshold.

Aspect 17: A method for wireless communications at a network entity, comprising: outputting signaling comprising control information associated with multi-layer phase tracking reference signaling; outputting, according to the control information and via a first transmission layer, data signaling at a first power level via a first set of subcarriers and one or more phase tracking reference signals at the first power level via a second set of subcarriers; and outputting, according to the control information and via a second transmission layer, the data signaling at the first power level via the first set of subcarriers and the second set of subcarriers.

Aspect 18: The method of aspect 15, wherein outputting the data signaling via the second transmission layer comprises: outputting first data signaling via a first transport block according to a first modulation and coding scheme; and outputting second data signaling via a second transport block according to a second modulation and coding scheme, wherein the second modulation and coding scheme has a lower value than the first modulation and coding scheme.

Aspect 19: The method of aspect 18, further comprising: including, in the second data signaling, a cyclic redundancy check corresponding to the second transport block; and encoding the second transport block according to a convolution code, a polar code, or a low density polar code, wherein outputting the second data signaling is based at least in part on the encoding.

Aspect 20: The method of aspect 15, wherein outputting the data signaling via the first set of subcarriers and the second set of subcarriers comprises: outputting the data signaling via the first set of subcarriers and the second set of subcarriers according to a first modulation and coding scheme, wherein a first phase noise error is associated with both the first transmission layer and the second transmission layer.

Aspect 21: The method of any of aspects 15 through 20, further comprising: obtaining, from at least one user equipment responsive to outputting the data signaling via the first transmission layer and the second transmission layer, a phase noise error estimation report.

Aspect 22: The method of any of aspects 15 through 21, wherein outputting the control signaling comprises: outputting a control message comprising an indication of the multi-layer phase tracking reference signaling, a first modulation and coding scheme associated with the first transmission layer, and a second modulation and coding scheme associated with the second transmission layer.

Aspect 23: The method of aspect 22, further comprising: obtaining, from a UE, an indication of a signal to noise ratio supported by the UE, wherein outputting the control message is based at least in part on the signal to noise ratio satisfying a threshold.

Aspect 24: The method of any of aspects 22 through 23, further comprising: obtaining, from a UE, an indication of a phase noise mask, a phase noise estimate, or both, wherein outputting the control message is based at least in part on the phase noise mask, the phase noise estimate, or both.

Aspect 25: The method of any of aspects 22 through 24, further comprising: obtaining, from a UE, a request for a transmission rank associated with the first transmission layer and the second transmission layer, a threshold difference between the first modulation and coding scheme and the second modulation and coding scheme, or both, wherein outputting the control message is based at least in part on the transmission rank, the threshold difference, or both.

Aspect 26: The method of any of aspects 22 through 25, wherein the control message comprises a radio resource control message comprising one or more parameters associated with the multi-layer phase tracking reference signaling.

Aspect 27: The method of any of aspects 22 through 25, wherein the control message comprises a downlink control information message activating the multi-layer phase tracking reference signaling.

Aspect 28: An apparatus for wireless communications at a UE, comprising a processor; memory coupled with the processor; and instructions stored in the memory and executable by the processor to cause the apparatus to perform a method of any of aspects 1 through 14.

Aspect 29: An apparatus for wireless communications at a UE, comprising at least one means for performing a method of any of aspects 1 through 14.

Aspect 30: A non-transitory computer-readable medium storing code for wireless communications at a UE, the code comprising instructions executable by a processor to perform a method of any of aspects 1 through 14.

Aspect 31: An apparatus for wireless communications at a network entity, comprising a processor; memory coupled with the processor; and instructions stored in the memory and executable by the processor to cause the apparatus to perform a method of any of aspects 15 through 27.

Aspect 32: An apparatus for wireless communications at a network entity, comprising at least one means for performing a method of any of aspects 15 through 27.

Aspect 33: A non-transitory computer-readable medium storing code for wireless communications at a network entity, the code comprising instructions executable by a processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

one or more processors;

memory coupled with the one or more processors; and instructions stored in the memory and executable by the one or more processors to cause the apparatus to:

receive signaling comprising control information associated with multi-layer phase tracking reference signaling;

receive, according to the control information and via a first transmission layer, data signaling via a first set of subcarriers and one or more phase tracking reference signals via a second set of subcarriers; and receive, according to the control information and via a second transmission layer, the data signaling via the first set of subcarriers and the second set of subcarriers, wherein a first average energy associated with the one or more phase tracking reference signals in the first transmission layer is the same as a second average energy associated with the data signaling in the first transmission layer and the second transmission layer.

2. The apparatus of claim 1, wherein the instructions to receive the data signaling via the second transmission layer are executable by the one or more processors to cause the apparatus to:

receive first data signaling via a first transport block according to a first modulation and coding scheme; and receive second data signaling via a second transport block according to a second modulation and coding scheme, wherein the second modulation and coding scheme has a lower value than the first modulation and coding scheme.

3. The apparatus of claim 2, wherein the instructions are further executable by the one or more processors to cause the apparatus to:

receive, in the second data signaling, a cyclic redundancy check corresponding to the second transport block; and decode the second transport block according to a convolution code, a polar code, or a low density polar code, wherein receiving the second data signaling is based at least in part on the decoding.

4. The apparatus of claim 3, wherein the instructions are further executable by the one or more processors to cause the apparatus to:

determine that the cyclic redundancy check does not pass for the second transport block;

transmit a feedback message using a feedback bit associated with the second transport block based at least in part on the determining; and monitor for a retransmission or a repetition of the second transport block based at least in part on transmitting the feedback message, wherein receiving the second data signaling is based at least in part on the monitoring.

5. The apparatus of claim 2, wherein the instructions are further executable by the one or more processors to cause the apparatus to:

estimate a first phase noise error for the first transmission layer based at least in part on the one or more phase tracking reference signals;

perform phase noise correcting for the first data signaling based at least in part on the first phase noise error;

estimate a second phase noise error for the second transmission layer based at least in part on decoding and re-encoding the second data signaling; and perform phase noise correction for the second data signaling based at least in part on the second phase noise error.

6. The apparatus of claim 1, wherein the instructions to receive the data signaling via the second transmission layer are executable by the one or more processors to cause the apparatus to:

receive the data signaling via the first set of subcarriers and the second set of subcarriers according to a first modulation and coding scheme, wherein a first phase noise error is associated with both the first transmission layer and the second transmission layer.

7. The apparatus of claim 6, wherein the instructions are further executable by the one or more processors to cause the apparatus to:

estimate a first phase noise error for the first transmission layer based at least in part on the one or more phase tracking reference signals;

perform phase noise correcting for the data signaling in the first transmission layer based at least in part on the first phase noise error; and perform phase noise correction for the data signaling in the second transmission layer based at least in part on the first phase noise error.

8. The apparatus of claim 1, wherein the instructions are further executable by the one or more processors to cause the apparatus to:

transmit, responsive to receiving the data signaling via the first transmission layer and the second transmission layer, a phase noise error estimation report.

9. The apparatus of claim 1, wherein the instructions to receive the signaling are executable by the one or more processors to cause the apparatus to:

receive a control message comprising an indication of the multi-layer phase tracking reference signaling, a first modulation and coding scheme associated with the first transmission layer, and a second modulation and coding scheme associated with the second transmission layer.

10. The apparatus of claim 9, wherein the instructions are further executable by the one or more processors to cause the apparatus to:

transmit an indication of a signal to noise ratio supported by the UE, wherein receiving the control message is based at least in part on the signal to noise ratio satisfying a threshold.

11. The apparatus of claim 9, wherein the instructions are further executable by the one or more processors to cause the apparatus to:

transmit an indication of a phase noise mask, a phase noise estimate, or both, wherein receiving the control message is based at least in part on the phase noise mask, the phase noise estimate, or both.

12. The apparatus of claim 9, wherein the instructions are further executable by the one or more processors to cause the apparatus to:

transmit a request for a transmission rank associated with the first transmission layer and the second transmission layer, a threshold difference between the first modulation and coding scheme and the second modulation and coding scheme, or both, wherein receiving the control message is based at least in part on the transmission rank, the threshold difference, or both.

13. The apparatus of claim 9, wherein the control message comprises a radio resource control message comprising one or more parameters associated with the multi-layer phase tracking reference signaling.

14. The apparatus of claim 9, wherein the control message comprises a downlink control information message activating the multi-layer phase tracking reference signaling.

15. The apparatus of claim 1, wherein the first average energy is correlated with the second average energy such that a difference between the first average energy and the second average energy satisfies an average energy threshold.

16. An apparatus for wireless communications at a network entity, comprising:

one or more processors;

memory coupled with the one or more processors; and instructions stored in the memory and executable by the one or more processors to cause the apparatus to:

output signaling comprising control information associated with multi-layer phase tracking reference signaling;

output, according to the control information and via a first transmission layer, data signaling at a first power level via a first set of subcarriers and one or more phase tracking reference signals at the first power level via a second set of subcarriers; and output, according to the control information and via a second transmission layer, the data signaling at the first power level via the first set of subcarriers and the second set of subcarriers, wherein a first average energy associated with the one or more phase tracking reference signals in the first transmission layer is the same as a second average energy associated with the data signaling in the first transmission layer and the second transmission layer.

17. The apparatus of claim 16, wherein the instructions to output the data signaling via the second transmission layer are executable by the one or more processors to cause the apparatus to:

output first data signaling via a first transport block according to a first modulation and coding scheme; and output second data signaling via a second transport block according to a second modulation and coding scheme, wherein the second modulation and coding scheme has a lower value than the first modulation and coding scheme.

18. The apparatus of claim 17, wherein the instructions are further executable by the one or more processors to cause the apparatus to:

include, in the second data signaling, a cyclic redundancy check corresponding to the second transport block; and encode the second transport block according to a convolution code, a polar code, or a low density polar code, wherein outputting the second data signaling is based at least in part on the encoding.

19. The apparatus of claim 16, wherein the instructions to output the data signaling via the first set of subcarriers and the second set of subcarriers are executable by the one or more processors to cause the apparatus to:

output the data signaling via the first set of subcarriers and the second set of subcarriers according to a first modulation and coding scheme, wherein a first phase noise error is associated with both the first transmission layer and the second transmission layer.

20. The apparatus of claim 16, wherein the instructions are further executable by the one or more processors to cause the apparatus to:

obtain, from at least one user equipment responsive to outputting the data signaling via the first transmission layer and the second transmission layer, a phase noise error estimation report.

21. The apparatus of claim 16, wherein the instructions to output the signaling are executable by the one or more processors to cause the apparatus to:

output a control message comprising an indication of the multi-layer phase tracking reference signaling, a first modulation and coding scheme associated with the first transmission layer, and a second modulation and coding scheme associated with the second transmission layer.

22. The apparatus of claim 21, wherein the instructions are further executable by the one or more processors to cause the apparatus to:

obtain, from a user equipment (UE), an indication of a signal to noise ratio supported by the UE, wherein outputting the control message is based at least in part on the signal to noise ratio satisfying a threshold.

23. The apparatus of claim 21, wherein the instructions are further executable by the one or more processors to cause the apparatus to:

obtain, from a user equipment (UE), an indication of a phase noise mask, a phase noise estimate, or both, wherein outputting the control message is based at least in part on the phase noise mask, the phase noise estimate, or both.

24. The apparatus of claim 21, wherein the instructions are further executable by the one or more processors to cause the apparatus to:

obtain, from a user equipment (UE), a request for a transmission rank associated with the first transmission layer and the second transmission layer, a threshold difference between the first modulation and coding scheme and the second modulation and coding scheme, or both, wherein outputting the control message is based at least in part on the transmission rank, the threshold difference, or both.

25. The apparatus of claim 21, wherein the control message comprises a radio resource control message comprising one or more parameters associated with the multi-layer phase tracking reference signaling.

26. The apparatus of claim 21, wherein the control message comprises a downlink control information message activating the multi-layer phase tracking reference signaling.

27. A method for wireless communications at a user equipment (UE), comprising:

receiving signaling comprising control information associated with multi-layer phase tracking reference signaling;

receiving, according to the control information and via a first transmission layer, data signaling via a first set of subcarriers and one or more phase tracking reference signals via a second set of subcarriers; and receiving, according to the control information and via a second transmission layer, the data signaling via the first set of subcarriers and the second set of subcarriers, wherein a first average energy associated with the one or more phase tracking reference signals in the first transmission layer is the same as a second average energy associated with the data signaling in the first transmission layer and the second transmission layer.

28. The method of claim 27, wherein receiving the data signaling via the second transmission layer comprises:

receiving first data signaling via a first transport block according to a first modulation and coding scheme; and receiving second data signaling via a second transport block according to a second modulation and coding scheme, wherein the second modulation and coding scheme has a lower value than the first modulation and coding scheme.

29. The method of claim 28, further comprising:

receiving, in the second data signaling, a cyclic redundancy check corresponding to the second transport block; and decoding the second transport block according to a convolution code, a polar code, or a low density polar code, wherein receiving the second data signaling is based at least in part on the decoding.

30. A method for wireless communications at a network entity, comprising:

outputting signaling comprising control information associated with multi-layer phase tracking reference signaling;

outputting, according to the control information and via a first transmission layer, data signaling at a first power level via a first set of subcarriers and one or more phase tracking reference signals at the first power level via a second set of subcarriers; and outputting, according to the control information and via a second transmission layer, the data signaling at the first power level via the first set of subcarriers and the second set of subcarriers, wherein a first average energy associated with the one or more phase tracking reference signals in the first transmission layer is the same as a second average energy associated with the data signaling in the first transmission layer and the second transmission layer.

* * * * *